(12) United States Patent
Oh et al.

(10) Patent No.: US 10,158,964 B2
(45) Date of Patent: Dec. 18, 2018

(54) METHOD AND APPARATUS FOR PROCESSING AUDIO SIGNAL

(71) Applicant: Gaudio Lab, Inc., Los Angeles, CA (US)

(72) Inventors: Hyunoh Oh, Seongnam-si (KR); Jeonghun Seo, Seoul (KR); Taegyu Lee, Seoul (KR); Yonghyun Baek, Seoul (KR)

(73) Assignee: Gaudio Lab, Inc., Los Angeles, CA (US)

( * ) Notice: Subject to any disclaimer, the term of this patent is extended or adjusted under 35 U.S.C. 154(b) by 0 days.

(21) Appl. No.: 15/457,957

(22) Filed: Mar. 13, 2017

(65) Prior Publication Data

US 2017/0265016 A1 Sep. 14, 2017

(30) Foreign Application Priority Data

Mar. 11, 2016 (KR) .................. 10-2016-0029706

(51) Int. Cl.
*H04S 7/00* (2006.01)
*G06K 9/00* (2006.01)
*G06K 9/62* (2006.01)
*H04N 21/439* (2011.01)
*H04N 21/234* (2011.01)
(Continued)

(52) U.S. Cl.
CPC ............ *H04S 7/303* (2013.01); *G06K 9/0057* (2013.01); *G06K 9/00711* (2013.01); *G06K 9/6215* (2013.01); *H04N 21/23412* (2013.01); *H04N 21/4394* (2013.01); *H04N 21/44008* (2013.01); *H04S 7/30* (2013.01); *H04N 21/233* (2013.01); *H04N 21/234* (2013.01);
(Continued)

(58) Field of Classification Search
CPC ........ H04S 7/30; H04S 7/303; H04S 2470/01; H04S 2470/11; H04S 2400/11; G11B 27/031; H04N 21/439; H04N 21/4394; H04N 21/4398; H04N 21/44008; H04N 21/233; H04N 21/234; H04N 21/23412; H04N 21/23418; H04N 21/44012; G06T 2200/04; G06K 9/0057; G06K 9/6215; G06K 9/00523; G06K 9/0053; G06K 9/00711; G06K 2009/00738
USPC .......... 700/94; 382/103, 106, 107, 154, 236; 381/17, 18, 22, 23, 310
See application file for complete search history.

(56) References Cited

U.S. PATENT DOCUMENTS

2002/0150254 A1* 10/2002 Wilcock .................. G06F 3/167
381/1
2003/0053680 A1* 3/2003 Lin .......................... H04S 5/005
382/154

(Continued)

*Primary Examiner* — Jesse A Elbin
(74) *Attorney, Agent, or Firm* — Park, Kim & Suh, LLC

(57) ABSTRACT

Provided are an audio signal processing method and apparatus for adjusting a location of an audio object in correspondence to a location of a visual object. The audio signal processing apparatus includes a matching unit configured to select an audio object corresponding to a visual object extracted from a video signal among at least one audio object extracted from an audio signal, a location adjusting unit configured to adjust a location of a sound image of the audio signal based on a location of the selected audio object and a location of a visual object corresponding to the selected audio, and an output unit configured to output an audio signal whose the location of the sound image is adjusted.

13 Claims, 18 Drawing Sheets

(51) Int. Cl.
*H04N 21/44* (2011.01)
*H04N 21/233* (2011.01)

(52) U.S. Cl.
CPC .... *H04N 21/23418* (2013.01); *H04S 2400/11* (2013.01); *H04S 2420/01* (2013.01); *H04S 2420/11* (2013.01)

(56) References Cited

U.S. PATENT DOCUMENTS

| | | | | |
|---|---|---|---|---|
| 2013/0028424 A1* | 1/2013 | Kim | ................. | H04S 1/002 381/17 |
| 2014/0064517 A1* | 3/2014 | Ko | ................. | H04R 3/04 381/98 |
| 2014/0233917 A1* | 8/2014 | Xiang | ................. | G11B 27/031 386/285 |
| 2014/0314391 A1* | 10/2014 | Kim | ................. | G11B 27/11 386/248 |

* cited by examiner

FIG. 5D

| V_obj1 | L10 | L10 | L10 | L5 | 0  | R5 | R10 | R10 | R10 | R20 | R20 | R10 |
|--------|-----|-----|-----|----|----|----|----|-----|-----|-----|-----|-----|
| V_obj2 | 0   | 0   | R5  | 0  | 0  | R5 | R5 | R10 | R10 | 0   | L5  | 0   |
| V_obj3 | 0   | 0   | 0   | 0  | 0  | 0  | L5 | L5  | L5  | L5  | L5  | L5  |

⋮

──────────────────────────────────────────▶ time

| A_obj1 | 0   | 0   | 0   | 0  | 0  | 0  | L10 | L10 | L10 | 0   | R5  | R5  |
|--------|-----|-----|-----|----|----|----|-----|-----|-----|-----|-----|-----|
| A_obj2 | R5  | R5  | R5  | R5 | R5 | 0  | 0   | 0   | 0   | 0   | 0   | 0   |
| A_obj3 | L10 | L10 | L10 | L5 | 0  | R5 | R10 | R10 | R10 | R20 | R20 | R10 |

⋮

──────────────────────────────────────────▶ time

METHOD AND APPARATUS FOR PROCESSING AUDIO SIGNAL

CROSS-REFERENCE TO RELATED APPLICATION

This application claims priority to Korean Patent Application No. 10-2016-0029706 and all the benefits accruing therefrom under 35 U.S.C. § 119, the contents of which are incorporated by reference in their entirety.

BACKGROUND

The present disclosure relates to a signal processing method and apparatus for efficiently reproducing an audio signal, and more particularly, to an audio signal processing method and apparatus capable of adjusting the location of an audio object of an audio signal in correspondence to the location of a visual object included in a video signal.

With the development of video and sound technology, many multimedia contents that give a sense of immersion to users have been produced. The sense of immersion is an important factor in next generation contents such as 360-degree contents or VR contents. The content having excellent sense of immersion may make a user feel as if he is present in the virtual world in the content, and provide a user with a near-real experience.

In order to give a sense of immersion to contents during the production of the contents, various issues should be considered. First, the video and audio of the multimedia contents should basically harmonize with each other. That is, the moment when video content changes and the moment when audio content changes are required to coincide with each other temporally, and audio content related to video content should be located at the location where the video content exists. Next, a visual object or audio object provided to a user should be changed in correspondence to a user's gaze or head movement. These interactive features are particularly important in the next-generation contents described above, and the next-generation contents creators consider a method for effectively generating images and audios that immediately reflect a user's movement or manipulation as a major challenge.

If the video and the audio are not in harmony with one another, a user's sense of immersion for the corresponding multimedia content disappear instantly, and a user may not concentrate on the multimedia content due to incompatibility of the video and audio. That is, if the locations of visual objects in video and audio objects do not match with each other, a user feels a sense of heterogeneity due to inconsistency between a visual stimulus and an auditory stimulus. Also, in the case of next generation contents such as VR contents, if the location of an audio object does not change according to the direction of the head of a user, a sense of immersion may also be deteriorated.

Accordingly, a method for matching the locations of a visual object and an audio object with each other during the production of the contents is indispensably required. However, when producing or creating visual objects and audio objects, it is not easy to match the locations of two objects when their reference directions or locations are different. In addition, when the audio content does not have any interactive characteristics, such as a multi-channel stereo audio signal, there is no method currently available for changing the audio content in response to a change in a visual object. Also, there is a need for research on a method for using an audio signal that is not able to adjust the sound location according to the direction of the head of a user during the production of next generation contents, as in the case of the above-mentioned stereo audio signal.

SUMMARY

The present disclosure provides increased sense of immersion of multimedia contents provided to a user by adjusting an audio signal to allow a visual object of a video signal and an audio object of an audio signal to be in harmony with each other.

In accordance with an exemplary embodiment of the present invention, an audio signal processing apparatus includes: a matching unit configured to select an audio object corresponding to a visual object extracted from a video signal among at least one audio object extracted from an audio signal; a location adjusting unit configured to adjust a location of a sound image of the audio signal based on a location of the selected audio object and a location of a visual object corresponding to the selected audio object; and an output unit configured to output an audio signal whose the location of the sound image is adjusted.

Herein, the matching unit may select an audio object that is changed in correspondence to a change of the visual object.

Herein, the matching unit may select an audio object whose location is changed in correspondence to a change of a location of the visual object.

Herein, with respect to location tracking information indicating a relative change of a location of an object according to time, the matching unit may select an audio object related to location tracking information that is most similar to location tracking information of the visual object.

Herein, the matching unit may select an audio object whose acoustic feature is changed in correspondence to a change of a visual feature of the visual object.

Herein, the matching unit may select an audio object whose sound intensity is changed in correspondence to a change of at least one of a color, a shape, and a size of the visual object.

Herein, the matching unit may select an audio object whose sound intensity is changed in correspondence to a change of distance between a predetermined reference location and the visual object in a virtual video space according to the video signal.

Herein, the location adjusting unit may rotate a sound image of the audio signal based on a predetermined reference location in a virtual acoustic space according to the audio signal, and a degree of the rotation and a direction of the rotation may be determined based on a comparison result of a location of the selected audio object and a location of a visual object corresponding to the selected audio object Herein, the audio signal processing apparatus may further include an object extracting unit configured to extract a visual object from the video signal and extract an audio object from the audio signal, wherein the object extracting unit may extract at least one candidate visual object from the video signal based on a visual feature of the video signal, extract at least one candidate audio object from the audio signal based on an acoustic feature of the audio signal, calculate a location of the candidate visual object based on the visual feature, and calculate a location of the candidate audio object based on the acoustic feature; the matching unit may calculate a matching rate that the candidate audio object and the candidate visual object match each other according to a location change of the candidate audio object; and the location adjusting unit may adjust a location of a sound image of the audio signal in correspondence to a location change of the candidate audio object having the highest calculated matching rate.

Herein, the matching unit may calculate a similarity between an image pattern according to a visual feature of each candidate visual object and a predetermined reference pattern, and may not use the candidate visual object having an image pattern whose similarity is equal to greater than a predetermined similarity reference value in order to calculate a degree of matching.

Herein, the audio signal processing apparatus may further include an object extracting unit configured to extract an audio object from the audio signal, wherein the audio signal may include a plurality of individual audio signals; the object extracting unit may calculate a location of the extracted audio object based on a comparison result between the individual audio signals; and the location adjusting unit may adjust a signal value of the individual audio signal in correspondence to an adjustment of a sound image of the audio signal.

Herein, the object extracting unit may calculate an energy according to a frequency band of each of the individual audio signals, and calculates a location of the audio object based on a comparison result of energies according to a frequency band between each of the individual audio signals.

Herein, the audio signal processing apparatus may further include a sensing unit configured to detect a direction of a user's head, wherein with respect to a pair audio object that is the selected audio object and a pair visual object that is a visual object corresponding to the selected audio object, the location adjusting unit may adjust a location of a sound image of the audio signal based on the direction of the user's head, a direction of the pair visual object, and a direction of the pair audio object; and the direction of the pair visual object and the direction of the pair audio object may represent a degree to which the pair visual object and the pair audio object are rotated from a predetermined reference direction based on a predetermined reference location.

In accordance with another exemplary embodiment of the present invention, a multimedia signal processing apparatus includes: a matching unit configured to select an audio object corresponding to a visual object extracted from a video signal among at least one audio object extracted from an audio signal; a location adjusting unit configured to adjust at least one of a location of a sound image of the audio signal and a location of a visual image of the video signal based on a location of the selected audio object and a location of a visual object corresponding to the selected audio object; and an output unit configured to output a multimedia signal including an audio signal and a video signal, wherein the multimedia signal includes at least one of an audio signal whose location of the sound image is adjusted and a video signal whose location of the visual image is adjusted.

In accordance with another exemplary embodiment of the present invention, a control method of an audio signal processing apparatus includes: selecting an audio object corresponding to a visual object extracted from a video signal among at least one audio object extracted from an audio signal; adjusting a location of a sound image of the audio signal based on a location of the selected audio object and a location of a visual object corresponding to the selected audio object; and outputting an audio signal whose location of the sound image is adjusted.

BRIEF DESCRIPTION OF THE DRAWINGS

FIGS. 5A to 5E are views illustrating a method for matching a visual object and an audio object according to an embodiment of the present invention.

6A and 6B are views illustrating a method for adjusting a location of a sound image of an audio signal according to an embodiment of the present invention.

7A and 7B are views illustrating a method for adjusting a location of a sound image of an audio signal according to another embodiment of the present invention.

Figure 8:
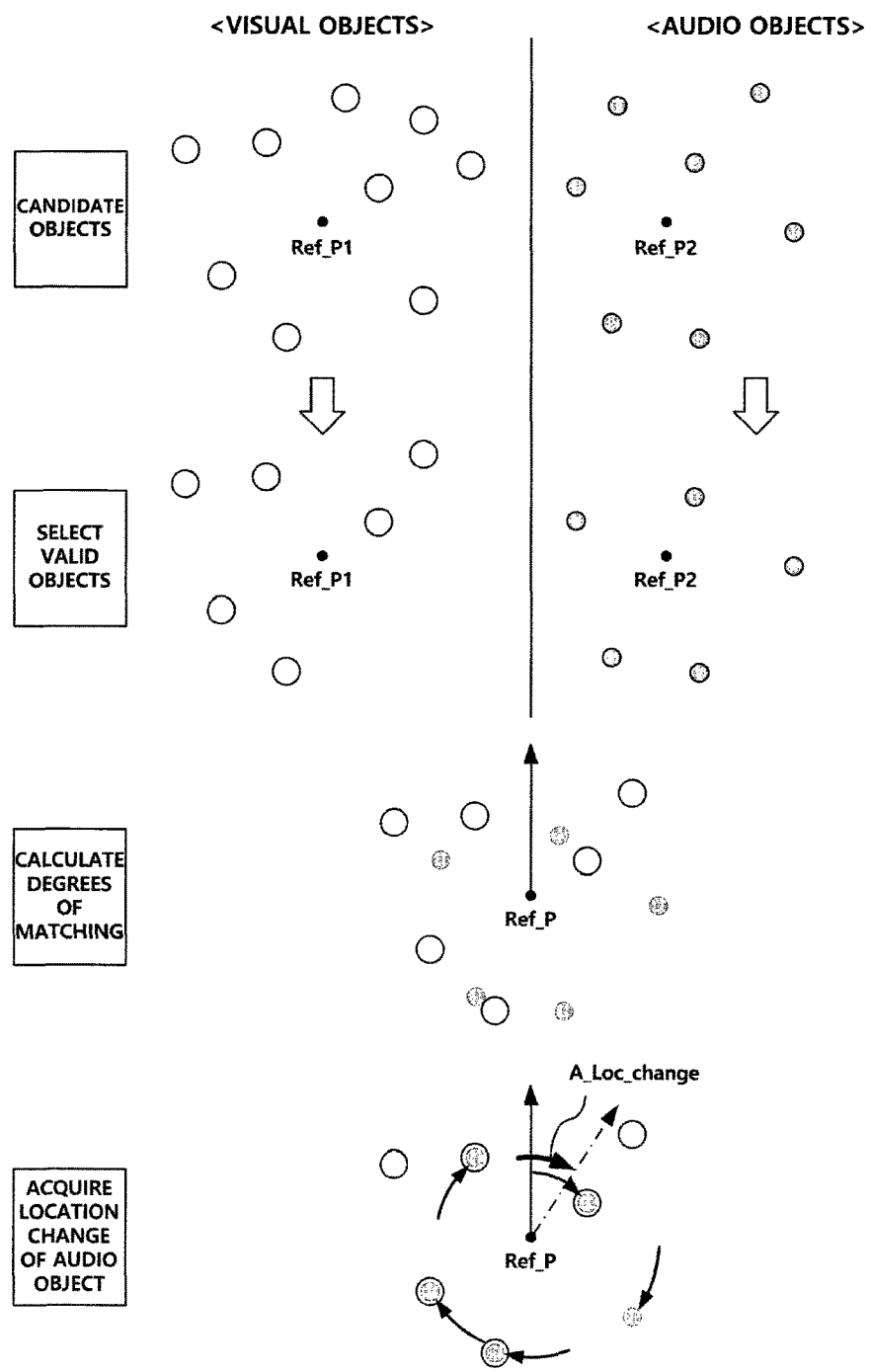

FIG. 8 is a view illustrating a method for matching a visual object with an audio object and adjusting the location of a sound image of the audio signal according to yet another embodiment of the present invention.

Figure 9:
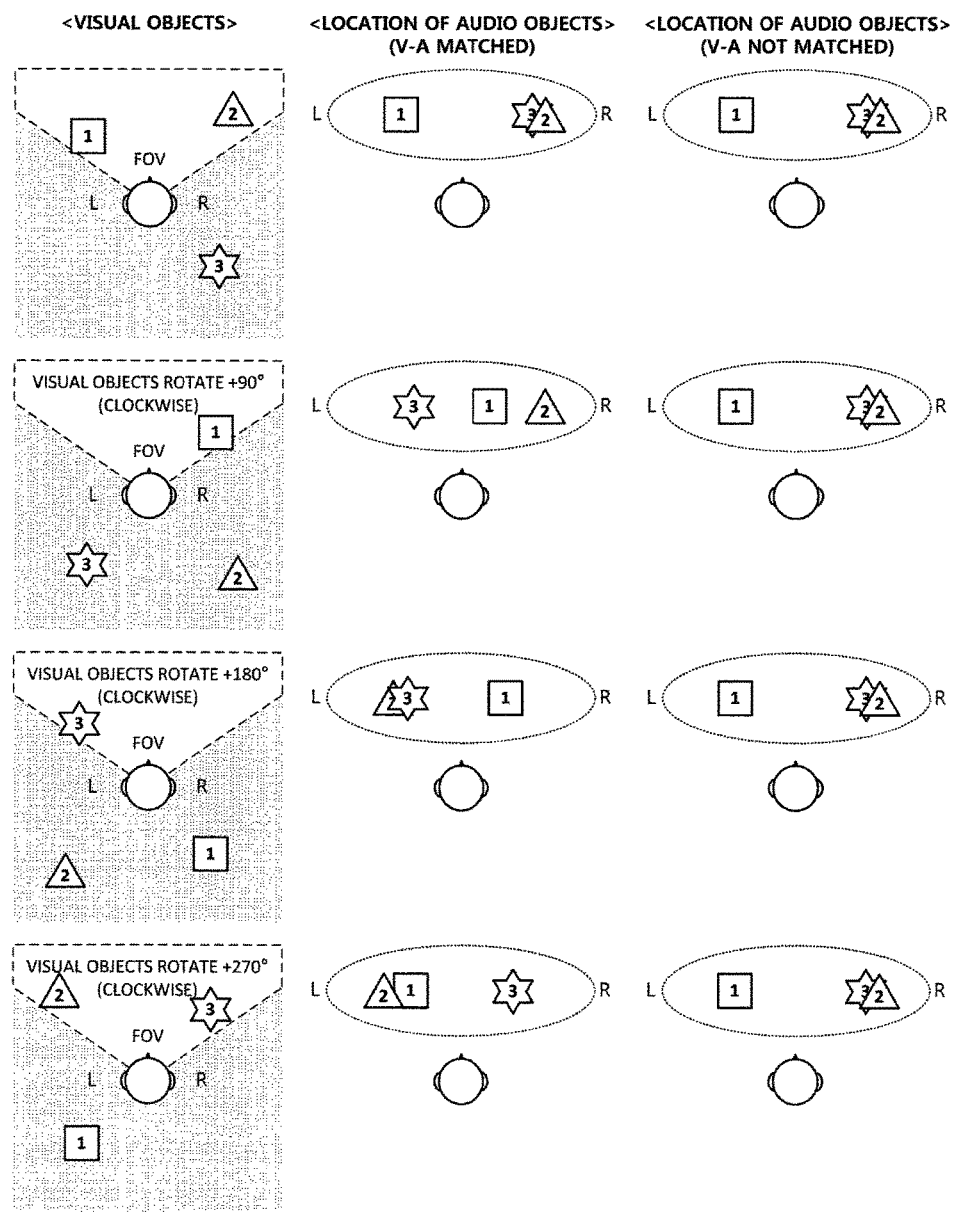

FIG. 9 is a view illustrating a location of an audio object according to a movement of a visual object.

Figure 10:
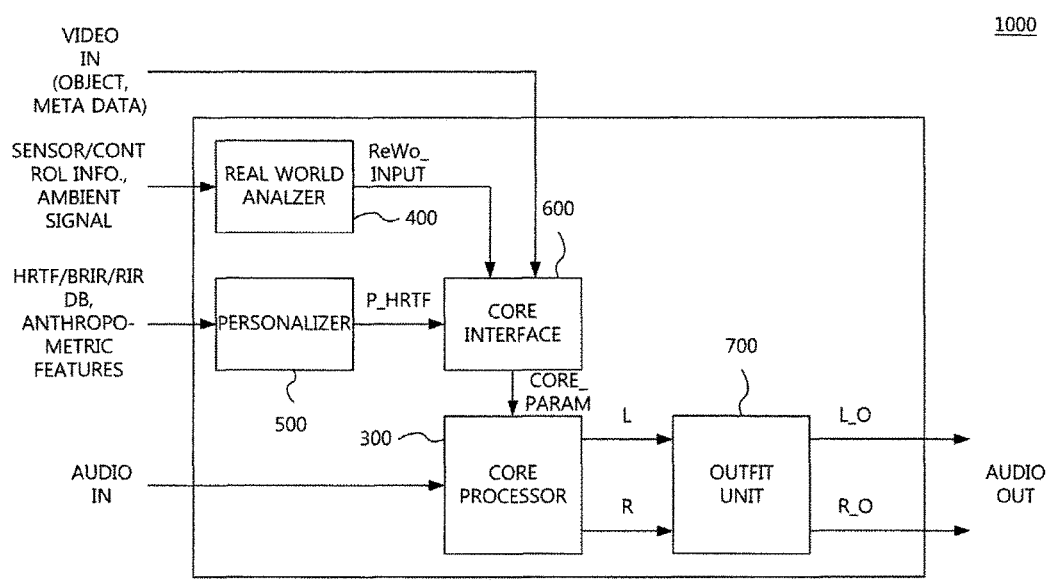

FIG. 10 is a view illustrating a binaural audio signal processing system according to an embodiment of the present invention.

Figure 11:
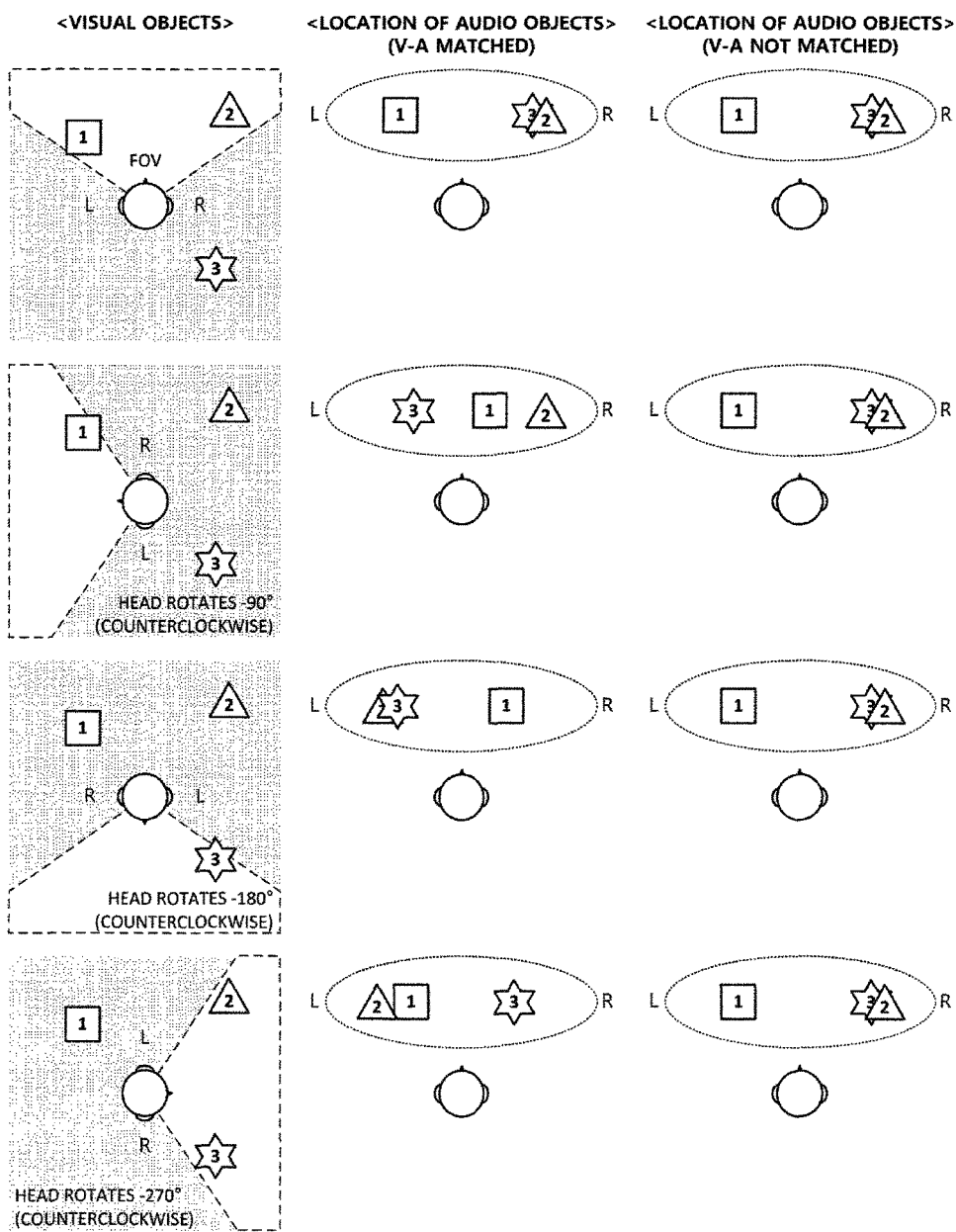

FIG. 11 is a view illustrating the location of an audio object according to a movement of a user's head.

Figure 12:
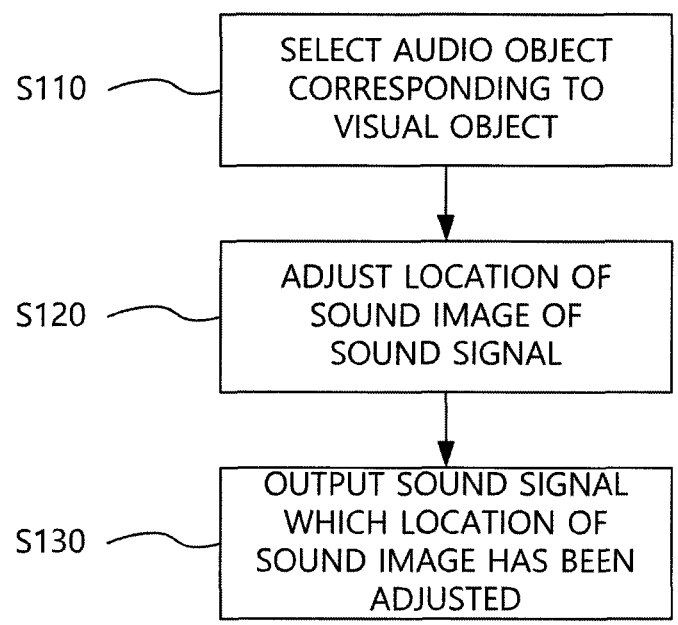

FIG. 12 is a view illustrating a control method of an audio signal processing apparatus according to an embodiment of the present invention.

DETAILED DESCRIPTION OF EMBODIMENTS

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and in this case, their meanings are described in a corresponding description part of the present invention. Accordingly, terms used in this specification should be interpreted based on the substantial meanings of the terms and contents over the whole specification.

Figure 1:
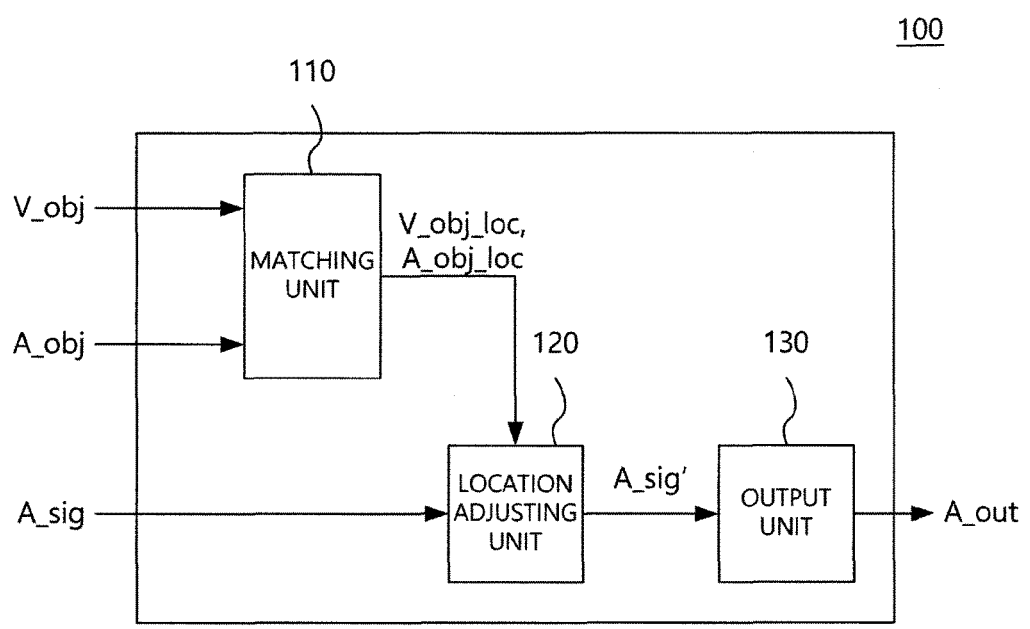
FIG. 1 is a view illustrating an audio signal processing apparatus according to an embodiment of the present invention.

FIG. 1 is a view illustrating an audio signal processing apparatus 100 according to an embodiment of the present invention. Referring to FIG. 1, the audio signal processing apparatus 100 may include a matching unit 110, a location adjusting unit 120, and an output unit 130. Some components of the audio signal processing apparatus 100 may be omitted or a plurality of components may be included in one component according to a method for implementing the present invention. The audio signal processing apparatus 100 according to an embodiment of the present invention may be hardware such as a microprocessor or an electronic circuit or software such as a program or firmware executed by the hardware, and also may be implemented by combining the hardware and the software.

Referring to FIG. 1, the audio signal processing apparatus 100 may receive a visual object V_obj, an audio object A_obj, and an audio signal A_sig, and generate an audio signal A_sig' whose sound image is modified, as a processing result. At this time, the audio object A_obj may be obtained from the audio signal. Here, the visual object V_obj may be extracted from a video signal based on visual features such as color, shape, and size. According to an embodiment of the present invention, the video signal may be a normal 2D video, 360-degree video, or VR video. Here, the extraction of the visual object V_obj may be performed through image/video signal processing for a plurality of pixel values included in the video signal, but an embodiment of the present invention is not limited thereto. Alternatively, the visual object may be an image pattern having the above-described visual feature, and the video signal may be a signal including at least one visual object. Alternatively, the visual object V_obj may be a signal corresponding to an object of an object-based video signal. At this time, the visual object V_obj may include meta data related to the location or characteristic (e.g., visual feature, etc.) of the visual object. Alternatively, the visual object V_obj may be the metadata itself, and thus the visual object information may be information indicating the location or characteristic of the visual object V_obj. Then, the audio object A_obj may be extracted from the audio signal A_sig based on an acoustic feature including a sound intensity, a frequency band, or an energy distribution for each frequency band. According to an embodiment of the present invention, the audio signal A_sig may include at least one of a multi-channel audio signal, an object-based audio signal, and a high order ambisonic (HOA) signal. Alternatively, the audio object A_obj may be a combination of an audio signal individually generated through recording and metadata related to the audio signal. Here, the metadata related to the audio signal may include various parameters related to the recording, channel, format, location, and audio signal of the audio signal. Alternatively, the audio object A_obj may be a signal corresponding to an object of the object-based audio signal. Also, the video signal from which the visual object V_obj is extracted and the audio signal A_sig may be signals included in the same multimedia content, but an embodiment of the present invention is not limited thereto, the video signal and the audio signal A_sig may be individually obtained or generated signals. At this time, the audio object A_obj may include metadata related to the location or characteristics of the audio object (e.g., acoustic feature, recording related information, channel information, format information, etc.). Alternatively, the audio object A_obj may be the metadata itself, and the audio object information may be information indicating the location or characteristic of the audio object A_obj. The description of the above-mentioned video signal, audio signal, visual object, and audio object may be also applied to the remaining drawings.

According to an embodiment of the present invention, the visual object V_obj and the audio object A_obj may have a location value (e.g., information) for a predetermined reference location. That is, the location of the visual object V_obj may be calculated during a process of extracting the visual object V_obj from a video signal or when the image pattern related to the visual object V_obj is generated, the location may be directly assigned (e.g., may include information on the location of metadata of a visual object). In the same manner, the location of the audio object A_obj may be calculated during a process of extracting the audio object A_obj from an audio signal, or when an audio signal related to the audio object A_obj is generated, the location may be directly assigned (e.g., information on the location may be included in metadata of an audio object).

The matching unit 110 may receive at least one of the visual object (V_obj) information and at least one audio object (A_obj) information, and may select the related visual object and audio object. Alternatively, the matching unit 110 may select the audio object A_obj corresponding to the visual object V_obj. Alternatively, the matching unit 110 may select the visual object V_obj corresponding to the audio object V_obj. Here, the related visual object and audio object may be referred to as a dominant audio-visual object.

A method in which the matching unit 110 selects visual objects and audio objects related to each other will be described in more detail with reference to FIGS. 5A to 5E.

The matching unit 110 may transmit the selected audio object information and the visual object information corresponding to the audio object to the location adjusting unit 120. Alternatively, the matching unit 110 may transmit the location (A_obj_loc) information of the selected audio object and the location (V_obj_loc) information of a visual object corresponding to the audio object to the location adjusting unit 120.

The location adjusting unit 120 may receive the audio signal A_sig and adjust the location of the audio object A_obj or the location of a sound image of the audio signal A_sig. Here, the audio signal A_sig may be an audio signal A_sig used to extract the audio object A_obj. Alternatively, the audio signal A_sig, as an object-based audio signal, may be a signal including at least one audio object. According to a preferred embodiment of the present invention, the location adjusting unit 120 may adjust the location of a sound image of the audio signal A_sig based on the location A_obj_loc of the selected audio object and the location V_obj_loc of a visual object corresponding to the selected audio object. Here, the location adjusting unit 120 may adjust the location of the entire sound image of the audio signal A_sig or the location of a sound image of the entire audio object, but the present invention is not limited thereto and the location adjusting unit 120 may only adjust the location of the sound image for some components (audio object, etc.) included in an audio signal. When the location of the entire sound image of the audio signal A_sig is adjusted, the location adjustment of the sound image of the audio signal may be referred to as an adjustment of the audio scene of the audio signal. The location adjustment of the sound image of the audio signal A_sig by the location adjusting unit 120 will be described in detail with reference to FIGS. 6A, 6B, 7A, and 7B.

The location adjusting unit 120 may transmit an audio signal A_sig' whose location of the sound image is adjusted to the output unit 130.

The output unit 130 may output an audio signal. The output unit 130 may include an audio output module for generating sound (or audio) that is a physical phenomenon based on an audio signal that is an electrical signal. According to a preferred embodiment of the present invention, the output unit 130 may output the audio signal A_sig' whose location of the sound image is adjusted. According to a method for implementing the present invention, the output unit 130 may further include a video output module for outputting a video signal, and accordingly, may output both an audio signal and a video signal. In addition, the output unit 130 may output a plurality of audio signals at the same time or may simultaneously output a plurality of individual audio signals included in an audio signal.

On the other hand, although it is shown In FIG. 1 that the matching unit 110 receives the visual object (V_obj) information, an embodiment of the present invention is not limited thereto, and the matching unit 110 may receive a video signal and obtain a visual object from the video signal. In this case, the matching unit 110 may separately include a configuration for extracting a visual object. Also, although it is shown that the matching unit 110 receives the audio object A_obj, the present invention is not limited thereto, and thus the matching unit 110 may receive the audio signal A_sig and obtain an audio object from the audio signal A_sig. In this case, the matching unit 110 may separately include a configuration for extracting an audio object. When extracting the visual object V_obj and the audio object A_obj, the matching unit 110 may obtain the locations of the respective objects when extracting each of the objects.

Figure 2:
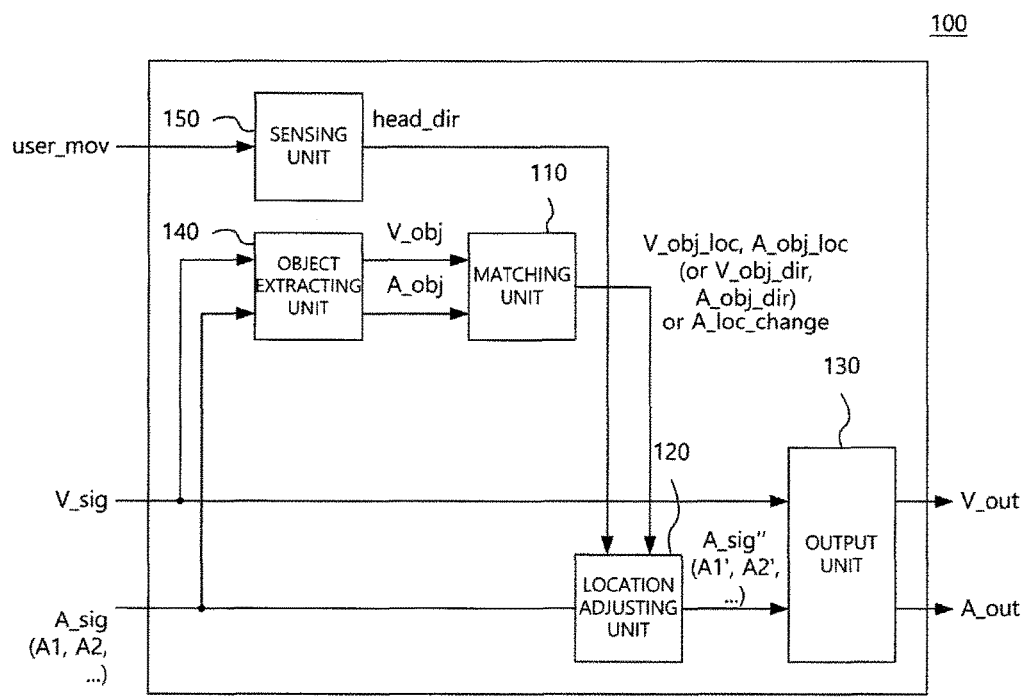
FIG. 2 is a view illustrating an audio signal processing apparatus according to another embodiment of the present invention.

FIG. 2 is a view illustrating an audio signal processing apparatus 100 according to another embodiment of the present invention. Referring to FIG. 1, the audio signal processing apparatus 100 may include a matching unit 110, a location adjusting unit 120, an output unit 130, an object extracting unit 140, and a sensing unit 150. Some components of the audio signal processing apparatus 100 may be omitted or a plurality of components may be included in one component according to a method for implementing the present invention. The audio signal processing apparatus 100 according to an embodiment of the present invention may be hardware such as a microprocessor or an electronic circuit or software such as a program or firmware executed by the hardware, and also may be implemented by combining the hardware and the software.

The matching unit 110, the location adjusting unit 120 and the output unit 130 of FIG. 2 have the same configuration as the matching unit 110, the location adjusting unit 120 and the output unit 130 of FIG. 1, and thus their detailed description will be omitted.

The object extracting unit 140 may receive a video signal V_sig or an audio signal A_sig and obtain at least one visual object V_obj from the video signal V_sig and obtain at least one audio object A_sig from the audio signal A_sig. Here, the video signal V_sig may directly include a visual object that exists separately, and the object extracting unit 140 may obtain a visual object by separating or distinguishing the visual object from the video signal. Alternatively, the object extracting unit 140 may extract a visual object V_obj from a video signal through various image signal processing techniques. The extraction of the visual object V_obj may be performed based on the visual feature of each part of the image of the video signal V_sig. For example, the object extracting unit 140 may extract a set of pixels, which are disposed in a closed outline where specific image components separated from the background are the same and have RGB color values similar to each other, as one visual object. Moreover, the audio signal A_sig may directly include an audio object that exists separately, and the object extracting unit 140 may obtain an audio object by separating or distinguishing the audio object from the audio signal. Alternatively, the object extracting unit 140 may extract an audio object from an audio signal through various audio signal processing techniques. The extraction of the audio object may be performed based on acoustic features such as energy according to the frequency band of an audio signal, and will be described in more detail with reference to FIG. 4.

The object extracting unit 140 may calculate the location of a visual object based on the visual feature of a video signal and calculate the location of an audio object based on the acoustic feature of an audio signal. According to the above description, the object extracting unit 140 may extract a visual object from a video signal based on a visual feature, and the location of the visual object may be obtained based on a location in a video from which the visual object is extracted. Then, it is described above that the object extracting unit 140 extracts an audio object from an audio signal based on an acoustic feature of an audio signal. Here, when an audio signal includes a plurality of individual audio signals (for example, each channel signal in the case of a multi-channel signal), by comparing the acoustic feature of each individual audio signal, an audio object may be extracted from the audio signal and the location of an audio object (or the location of a sound image) may be calculated at the same time. Of course, as described with reference to FIG. 1, the matching unit 110 may calculate the location of the visual object V_obj or the location of the audio object A_obj.

The object extracting unit 140 may transmit the obtained visual object (V_obj) information and the obtained audio object (A_obj) information to the matching unit 110. When the object extracting unit 140 calculates the the location of the visual object and the location of the audio object, the object extracting unit 140 may transmit the calculated location information of the visual object and the calculated location information of the audio object to the matching unit 110. The object extracting unit 140 may extract at least one candidate visual object (or candidate dominant visual object) based on the visual feature of the video signal V_sig and extract at least one candidate audio object (or candidate dominant audio object) based on the acoustic feature of the audio signal A_sig. The candidate visual object and candidate audio object are objects before they are selected as a visual object and an audio object to be referenced for adjusting the location of the sound image of the audio signal A_sig. The extracted candidate visual object information and the extracted candidate audio object information may be transmitted to the matching unit 110 and the matching unit 110 may verify the validity of the candidate visual object and the candidate audio object.

The sensing unit 150 may detect a user's movement user_mov and convert the detected movement of the user into an electrical signal. According to a preferred embodiment of the present invention, the sensing unit 150 may detect the movement or the location of the user's head or the direction corresponding to the location, thereby generating information indicating the direction head_dir of the user's head. Here, the direction head_dir of the head of the user may be represented as an angle indicating the degree of rotation from a predetermined reference direction based on a predetermined reference location, and accordingly, the sensing unit 150 may generate an angle value head_dir_ang indicating the direction of the head of the user. The sensing unit 150 may transmit the direction (head_dir) information of the user's head or the angle value head_dir_ang indicating the direction of the user's head to the location adjusting unit 120.

The matching unit 110 of FIG. 2 may select the audio object A_obj corresponding to the visual object V_obj in the same manner as the matching unit 110 of FIG. 1. Such processing of the matching unit 110 may be referred to as 'matching' or 'object matching' or 'related object selection'. Then, the selected audio object may be named as a pair audio object, and the visual object corresponding to the selected audio object may be named as a pair visual object. Referring to FIG. 2, the matching unit 110 may perform matching in various manners. According to an embodiment of the present invention, the matching unit 110 may select the audio object A_obj that changes in correspondence to the change of the visual object V_obj. Alternatively, the matching unit 110 may calculate the matching rate that the audio object A_obj and the visual object V_obj match each other according to the location change of all or at least some audio objects A_obj and the matching unit 110 may obtain the location change value A_loc_change of the audio object having the highest calculated matching rate. Here, the matching unit 110 may perform a validity check on the candidate visual object and the candidate audio object received from the object extracting unit 140. According to a preferred embodiment of the present invention, the matching unit 110 may determine whether each candidate visual object is used to calculate the degree of matching based on the visual feature of each candidate visual object, and perform the validity check by determining whether to use each candidate audio object to calculate the degree of matching based on the acoustic feature of each candidate audio object. The validated candidate visual object may be named as the above-mentioned visual object or dominant visual object, and the validated candidate audio object may be named as the above-mentioned audio object or dominant audio object. The matching method of the matching unit 110 will be described in detail with reference to FIGS. 5A to 5E and FIG. 8. On the other hand, as shown in FIG. 1, the visual objects and audio objects matched with each other may be named as dominant audio visual objects.

On the other hand, the matching unit 110 may obtain locations from each of the matched visual objects and audio objects. That is, the matching unit 110 may obtain the location A_obj_loc of the selected audio object (i.e., the pair audio object) and the location V_obj_loc of the visual object (i.e., the pair visual object) corresponding to the selected audio object. Here, the visual object and the audio object may be located in a predetermined direction (e.g., a direction according to the location of each object) based on a predetermined reference location. More specifically described, the direction of the visual object and the direction of the audio object may indicate a degree to which the visual object and the audio object are rotated from a predetermined reference direction based on a predetermined reference location. Moreover, the direction A_obj_dir of the selected audio object and the direction V_obj_dir of the visual object corresponding to the selected audio object may be respectively represented by angle values A_obj_ang and V_obj_ang indicating the degree of rotation. The direction or angle value of each object described above may be obtained together during a process of extracting each object through the object extracting unit 140.

The matching unit 110 may transmit the matched visual object information (or pair visual object information) and the matched audio object information (or pair audio object information) to the location adjusting unit 120. Alternatively, the matching unit 110 may transmit the location (A_obj_loc) information of the selected audio object and the location (V_obj_loc) information of a visual object corresponding to the selected audio object to the location adjusting unit 120. Alternatively, the matching unit 110 may transmit the direction (A_obj_dir) information of the selected audio object and the direction (V_obj_dir) information of a visual object corresponding to the selected audio object to the location adjusting unit 120. Alternatively, the matching unit 120 may transmit the location change value A_loc_change to the location adjusting unit 120.

Like the location adjusting unit 120 of FIG. 1, the location adjusting unit 120 of FIG. 2 may receive the audio signal A_sig and adjust the location of the sound image of all or part of the audio signal A_sig. At this time, the location adjusting unit 120 may adjust the sound image of the audio signal based on the location A_obj_loc of the selected audio object and the location V_obj_loc of the visual object corresponding to the selected audio object. Alternatively, the location adjusting unit 120 may adjust the location of the sound image of the audio signal based on a combination of the direction value A_obj_dir of the selected audio object, the direction of a visual object corresponding to the selected audio object, and the direction head_dir of the user's head. Alternatively, the location adjusting unit 120 may adjust the location of the sound image of the audio signal based on a combination of an angle value A_obj_ang indicating the direction of the selected audio object, an angle value V_obj_ang indicating the direction of the visual object corresponding to the selected audio object, and an angle value head_dir_ang indicating the direction of the user's head. Alternatively, the location adjusting unit 120 may adjust the location of the sound image of the audio signal based on the location change value A_loc_change.

On the other hand, the location adjusting unit 120 may receive the audio signal A_sig including a plurality of individual audio signals A1, A2, . . . . The location adjusting unit 120 may adjust each signal value of the individual audio signals A1, A2, . . . in correspondence to the location adjustment of the sound image, and as a result, the individual audio signals A1', A2', . . . whose each signal value is adjusted may be generated and transmitted to the output unit 130.

According to an embodiment of the present invention, the output unit 130 of FIG. 2 may output a multimedia signal including an audio signal and a video signal. Here, the multimedia signal may include an audio signal whose sound image location is adjusted. In addition, an audio signal processing apparatus or a multimedia signal processing apparatus according to an embodiment of the present invention may adjust at least one of the location of a sound image of the audio signal and the location of a visual image of the video signal, based on the location of the selected audio object and the location of the visual object corresponding to the selected audio object In this case, the multimedia signal outputted from the output unit 130 may include at least one of an audio signal whose location of the sound image is adjusted and a video signal whose location of the visual image is adjusted. The visual image, the location adjustment of the visual image, and the multimedia signal processing apparatus will be described later.

Figure 3:
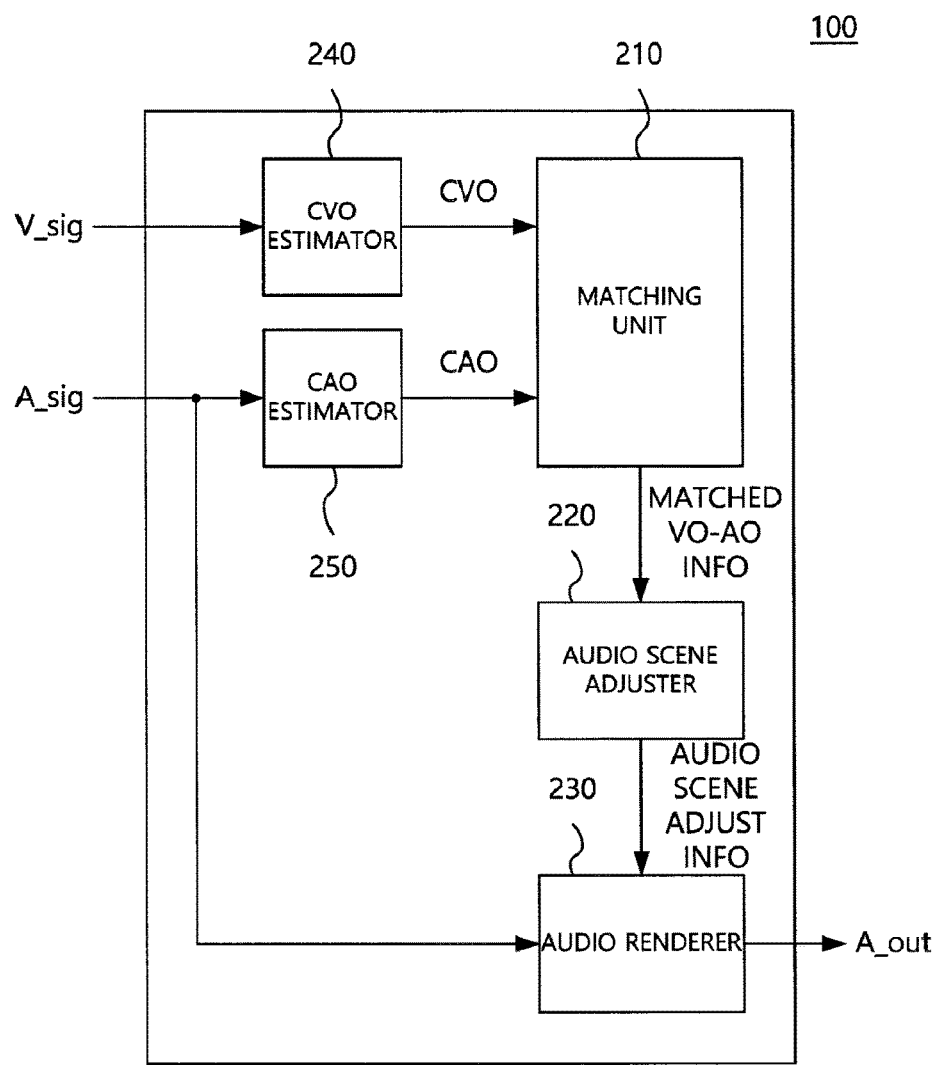
FIG. 3 is a view illustrating an audio signal processing apparatus according to yet another embodiment of the present invention.

FIG. 3 is a view illustrating an audio signal processing apparatus 100 according to yet another embodiment of the present invention. Referring to FIG. 3, the audio signal processing apparatus 100 may include a matching unit 210, an audio scene adjuster 220, an audio renderer 230, a candidate visual object estimator 240, and a candidate audio object estimator 250.

The candidate visual object estimator 240 and the candidate audio object estimator 250 play a role similar to that of the object extractor 140 of FIG. 2. The candidate visual object estimator 240 may receive the video signal V_sig and extract at least one candidate visual object CVO from the video signal V_sig and the candidate audio object estimator 250 may receive the audio signal A_sig and extract at least one candidate audio object CAO from the audio signal A_sig. At this time, the candidate visual object estimator 240 may calculate a validity value indicating the degree of validity of each candidate visual object CVO or a validity probability value indicating a probability of being determined as valid, based on the visual feature of the video signal V_sig. For example, there is a case where it is difficult to recognize it as one independent visual object because a corresponding object is not well separated from the background or the outline is ambiguous during the process of extracting a candidate visual object, and in this case, the candidate visual object may have a low validity value. Alternatively, since a visual object such as the sun or a grass in a video is not related to sound, there may be no related audio object in the subsequent matching process. If the pattern represented by the pixels of a visual object represents the sun, the corresponding visual object may have a low validity value. Then, the candidate audio object estimator 250 may calculate a validity value or a validity probability value indicating a degree to which each candidate audio object CAO is valid based on the acoustic feature of the audio signal A_sig. For example, an audio object related to the energy present in almost all frequency bands in the audio signal A_sig is more likely to be noise, and accordingly, the candidate audio object may have a low validity value. The validity value of each candidate object may be transmitted to the matching unit 210.

The matching unit 210 plays a role similar to that of the matching unit 110 of FIG. 1 and FIG. 2. The matching unit 210 may compare the candidate visual object CVO and the candidate audio object CAO received from the candidate visual object estimator 240 and the candidate audio object estimator 250 and select visual objects and audio objects matching (or related to) each other based on the comparison result. The matching unit 210 may refer to the validity value or the validity probability value of each candidate object described above when performing the matching. Preferably, the matching unit 210 may perform the matching by using a candidate visual object CVO and a candidate audio object CAO having a validity value or a validity probability value of a predetermined value or more. The matching unit 210 may generate information MATCHED VO-AO INFO on visual objects and audio objects matched with each other. The information MATCHED VO-AO INFO on the matched visual objects and audio objects may individually include the identifiers of the matched candidate visual objects and candidate audio objects and the locations of the matched visual objects and audio objects.

The audio scene adjuster 220 and the audio renderer 230 play a role similar to that of the location adjusting unit 120 of FIGS. 1 and 2. First, the audio scene adjuster 220 may determine a degree to which the location of the sound image of the audio signal is adjusted based on the information MATCHED VO-AO INFO on the matched visual object and audio object. For example, the audio scene adjuster 220 may assume the situation that the visual object is located at a location that is 30 degrees away from the audio object in the clockwise direction with respect to the matched visual objects and audio objects. The audio scene adjuster 220 may calculate a location correction value for reducing the angular difference, and in the case of the above example, a location correction value for rotating the audio object clockwise by 30 degrees may be calculated. The location correction value may be referred to as audio scene adjustment information AUDIO SCENE ADJUST INFO.

The audio renderer 230 may receive the audio signal A_sig and adjust the location of the sound image of the audio signal A_sig based on the location correction value or the adjusted audio scene information ADJUSTED AUDIO SCENE INFO. Here, if there is a head-related transfer function (HRTF) for the location of the matched audio object, the audio renderer 230 may adjust the location of the sound image by applying the HRTF corresponding to the location of the sound image adjusted with respect to the audio signal A_sig. In addition, the audio renderer 230 may also apply an additional processing process to a corresponding audio object based on the acoustic feature or related audio parameters of the matched audio object. For example, the auditory volume value indicating the volume of the audio object in the acoustic space may be set in the matched audio object. In this case, the audio renderer 230 may apply a filter such as a decorrelator to the audio signal related to the matched audio object to apply the auditory volume value.

The audio renderer 230 may generate the audio signal A_out whose location of the sound image is adjusted through the above process.

According to an embodiment of the present invention, an audio signal processing apparatus may continuously adjust the sound image of the audio signal. That is, when the audio signal and the video signal are composed of a plurality of frames, an audio signal processing apparatus may perform object matching for each frame, and based on the locations of the matched visual objects and audio objects, adjust the location of the sound image of the audio signal of each frame. If the video signal and the audio signal are provided to a user in real time, an audio signal processing apparatus may adjust the location of the sound image of the audio signal of each frame in real time. However, an embodiment of the present invention is not limited thereto, and an audio signal processing apparatus may adjust the location of the sound image of the audio signal only once when object matching is first performed, or may adjust the location of the sound image of the audio signal a predetermined number of times.

Figure 4:
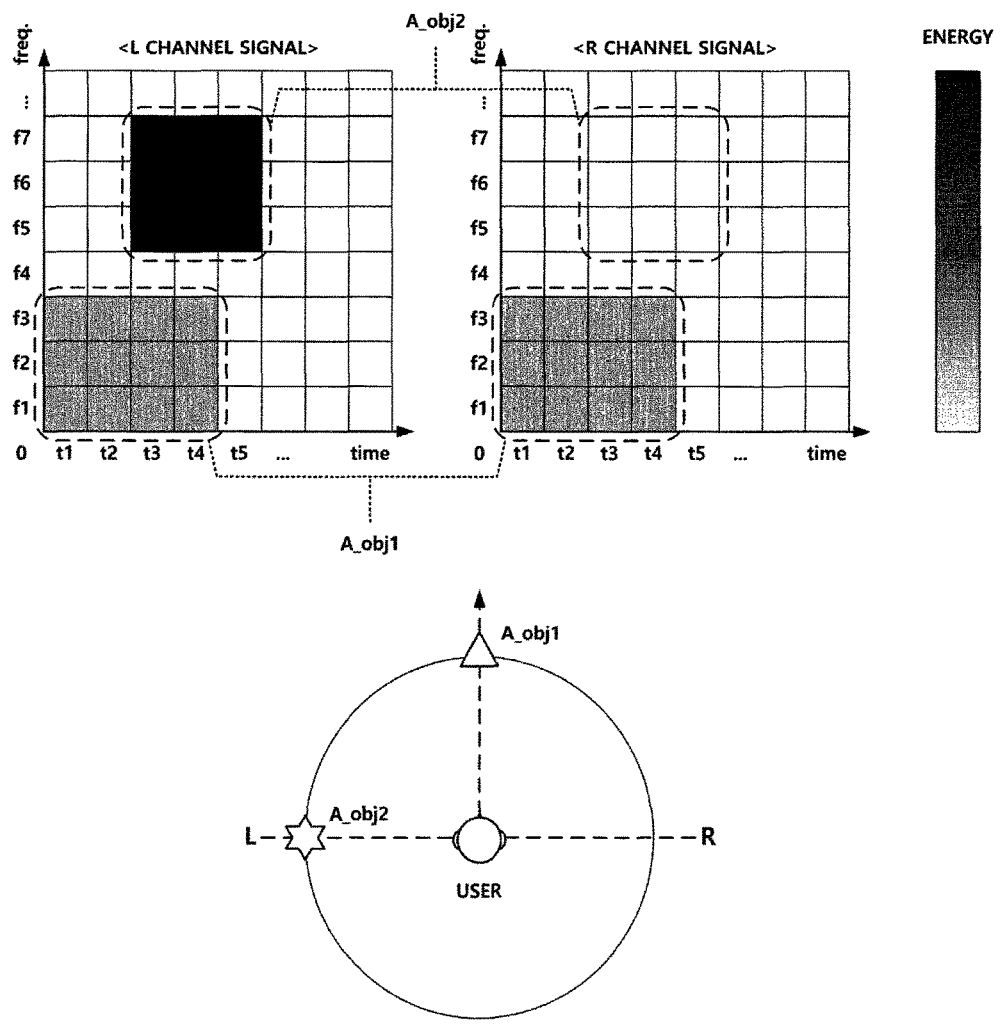
FIG. 4 is a diagram illustrating a method for extracting audio objects according to an embodiment of the present invention.

FIG. 4 is a diagram illustrating a method for extracting audio objects according to an embodiment of the present invention. In FIG. 4, the horizontal axis of the graph represents a time slot, and the vertical axis represents a frequency band. In the graph of FIG. 4, as it is closer to white, energy is smaller, and as it is closer to black, energy is greater. Thus, in the graph of FIG. 4, the brightness of each lattice represents the energy of a certain frequency band of a certain time slot.

According to an embodiment of the present invention, the audio signal may include a plurality of individual audio signals. Here, the individual audio signal may be a signal representing each audio object. Alternatively, the individual audio signal may refer to each channel signal of a multi-channel signal or a HOA signal. Then, an audio signal processing apparatus according to an embodiment of the present invention may extract an audio object based on a comparison result between the individual audio signals, and calculate the location of the extracted audio object.

In FIG. 4, it is assumed that the audio signal is a two-channel stereo audio signal. Accordingly, each individual audio signal may be an L channel signal and an R channel signal. An audio signal processing apparatus may perform a time frequency analysis on the L channel signal and the R channel signal, and for example, obtain energy distribution information as shown in FIG. 4 through a method such as Short Time Fourier Transform (STFT). An audio signal processing apparatus may compare the same time slot and the same frequency band of the L channel signal and the R channel signal and distinguish a lattice having a similar energy ratio in the graph of FIG. 4. For example, in the graph of FIG. 4, it is assumed that the energy of the white portion is 0 and the energy of the black portion is 100. The lattices corresponding to the time slots t1 to t4 and the frequency bands f1 to f3 in the L channel signal and the R channel signal include the same energy 50. That is, since the energy ratio of the L channel signal and the R channel signal is 50:50 equally in the time slots t1 to t4 and the frequency bands f1 to f3, the audio signal corresponding to a corresponding lattice may be extracted as the first audio object A_obj1. Similarly, since the energy ratio of the L channel signal and the R channel signal is 100:0 equally in the time slots t3 to t5 and the frequency bands f5 to f7, the audio signal corresponding to a corresponding lattice may be extracted as the second audio object A_obj2.

On the other hand, an audio signal processing apparatus may calculate the energy according to the frequency band of each individual audio signal, and calculate the location of the audio object based on the comparison result of the energy according to the frequency band between the individual audio signals. For example, referring to FIG. 4, an audio signal processing apparatus may calculate the location of the audio object based on the energy ratio of the audio object. That is, since the energy ratio of the L channel signal and the R channel signal with respect to the first audio object A_obj1 is 50:50 equally, an audio signal processing apparatus may assume that the location of the first audio object (or the location of the sound image) is the front of a user in a planar acoustic space using a user USER as a center. Since the energy ratio of the L channel signal and the R channel signal with respect to the second audio object A_obj2 is 100:0, an audio signal processing apparatus may assume that the location of the second audio object is the left of a user in a planar acoustic space using a user USER as a center. At this time, when the user's listening environment is implemented through a two-channel stereo speaker, the location of the second audio object A_obj2 may correspond to the location of the L channel speaker.

On the other hand, even when the audio signal is the HOA signal, it is possible to calculate the location of the audio object by comparing the individual audio signals. Each channel signal of the HOA signal includes at least a portion of the entire sound field instead of an individual audio object, and an energy-concentrated location (or direction) may be obtained by applying beam steering, non-negative matrix factorization, singular value decomlocation (SVD), etc. to each channel signal. Then, the location adjustment of the sound image of the audio signal may be performed through yaw, pitch, and roll conversion with respect to the energy-concentrated location.

Meanwhile, when the audio signal is an object-based audio signal, an audio signal processing apparatus according to an embodiment of the present invention may obtain the locations of the audio object and the audio object from metadata included in the object-based audio signal. Alternatively, an audio signal processing apparatus according to an embodiment of the present invention may receive information indicating the location of an audio object and information indicating the location of a visual object and then adjust the location of a sound image of the audio signal based on the information indicating the two locations. Here, the information indicating the location of the audio object may be metadata of the audio signal (or audio object), and the information indicating the location of the visual object may be metadata of the video signal (or visual object). If the audio object information is the metadata itself of the audio signal, an audio signal processing apparatus may directly obtain the location of the audio object from the audio object information. In this case, an audio signal processing apparatus may not perform the above-described extraction of a separate audio object, and perform object matching using the locations of the obtained audio object and audio object. This is true even if the video signal is an object-based video signal. That is, an audio signal processing apparatus may not perform a separate visual object extraction. Then, an audio signal processing apparatus may perform object matching using the location information of the visual object obtained from the object-based video signal or the location information of the visual object included in the visual object that is the metadata of the video signal itself.

FIGS. 5A to 5E are views illustrating a method for matching a visual object and an audio object according to an embodiment of the present invention.

According to an embodiment of the present invention, an audio signal processing apparatus may select an audio object (or a candidate audio object) that changes in correspondence to a change of a visual object (or a candidate visual object). Here, the change may include a change in the location of an object and a change in the feature of an object (e.g., visual feature and acoustic feature) but the change is not limited thereto.

According to a preferred embodiment of the present invention, an audio signal processing apparatus may select an audio object whose location is changed in correspondence to a change in the location of a visual object. Here, the location of the visual object may be a value indicating a distance or a displacement between a point at which the visual object is located and a predetermined reference point in a virtual video plane or a video space according to the video signal. Accordingly, the location may be a vector from the reference point to a point at which the visual object is located. Alternatively, when the virtual video space is implemented as a three-dimensional space, the location of the visual object may be represented by a coordinate value on a rectangular coordinate system, a spherical coordinate system, or a cylindrical coordinate system. This is also identical for audio objects. Here, the location of the audio object may be a value indicating a distance or a displacement between a point at which the audio object is located and a predetermined reference point in a sound field or acoustic space of the audio signal and may be represented by a coordinate value on a rectangular coordinate system, a spherical coordinate system, or a cylindrical coordinate system.

Figure 5A:
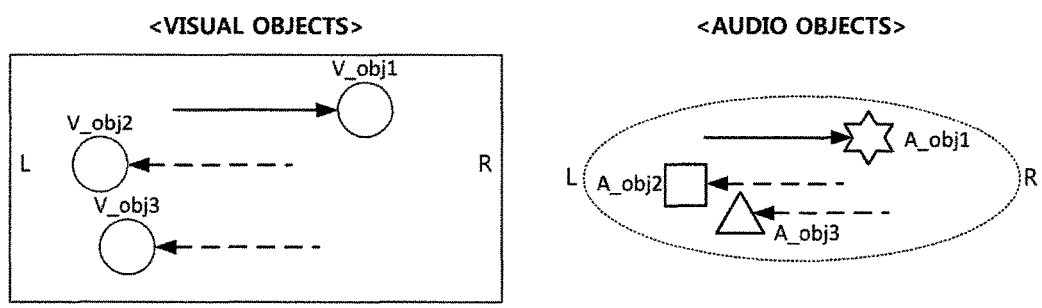

FIG. 5A is a view illustrating a change in location of a plurality of visual objects and a plurality of audio objects. Referring to FIG. 5A, the first visual object V_obj1 moves to the right, and the second visual object V_obj2 and the third visual object V_obj3 move to the left. Then, the first audio object A_obj1 moves to the right, and the second audio object A_obj2 and the third audio object A_obj3 move to the left. An audio signal processing apparatus according to an embodiment of the present invention may compare the locational change of the visual object with the locational change of the audio object and match the visual object and the audio object that represent the same or similar locational change. In FIG. 5A, since the first visual object V_obj1 and the first audio object A_obj1 move to the right, the audio signal processing apparatus may determine that they are objects related to each other. On the other hand, the audio signal processing apparatus may determine that the second visual object V_obj2 and the second audio object A_obj2 are matched and the third visual object V_obj3 and the third audio object A_obj1 are matched by referring to the locational changes of the remaining visual objects and audio objects.

On the other hand, according to FIG. 5A, the second audio object A_obj2 and the third audio object A_obj3 all move to the left. In this case, the audio signal processing apparatus may perform matching based on the relative locational relationship between the plurality of audio objects moving in the same direction. That is, the audio signal processing apparatus may determine that the location of the second audio object A_obj2 is located further to the left than the third audio object A_obj3 with respect to the same time, and accordingly, the second audio object A_obj2 matches the second visual object V_obj2 located further to the left.

Figure 5B:
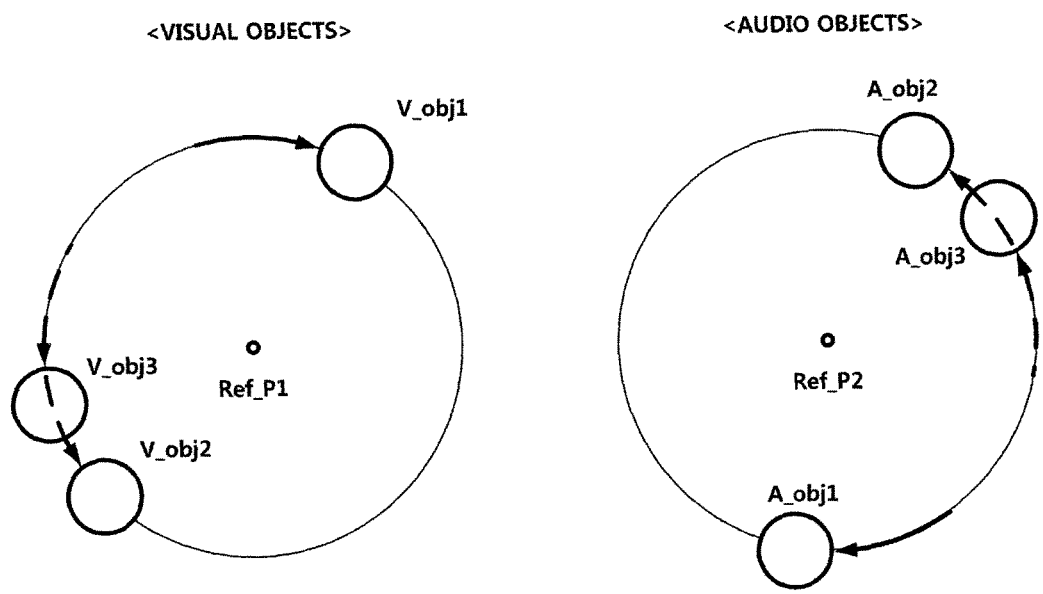

FIG. 5B is a view illustrating a change in location of a plurality of visual objects and a plurality of audio objects according to another embodiment of the present invention. FIG. 5B is similar to the case of FIG. 5A except that the first visual object V_obj1 and the first audio object A_obj1 rotate in the clockwise direction based on a predetermined first reference location Ref_P1 and a predetermined second reference location Ref_P2. Then, the second visual object V_obj2 and the third visual object V_obj3 are rotated counterclockwise around the first reference location Ref_P1 and the second audio object A_obj2 and the third audio object A_obj3 are rotated counterclockwise about the second reference location Ref_P2. An audio signal processing apparatus according to an embodiment of the present invention matches the first visual object V_obj1 to the first audio object A_obj1, the second visual object V_obj2 to the second audio object A_obj2, the third visual object V_obj3 to the third audio object A_obj3, based on the rotation direction around the predetermined reference locations Ref_P1 and Ref_P2 of the respective objects and the above-mentioned relative locational relationship. The matching method of FIG. 5B may be particularly useful when matching objects of a 360-degree video signal and an object-based audio signal. Meanwhile, according to a preferred embodiment of the present invention, the first reference location Ref_P1 and the second reference location Ref_P2 may be the location of a user.

Figure 5C:
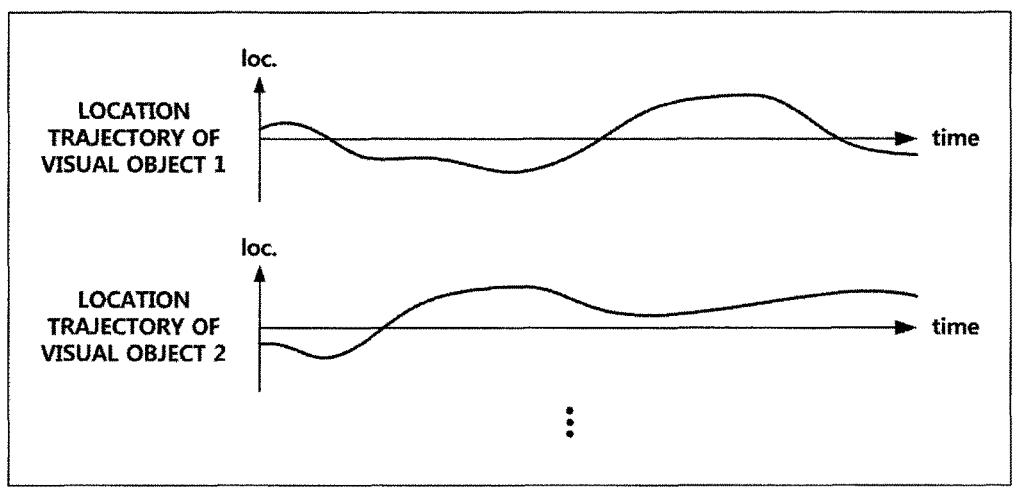
Figure 5C:
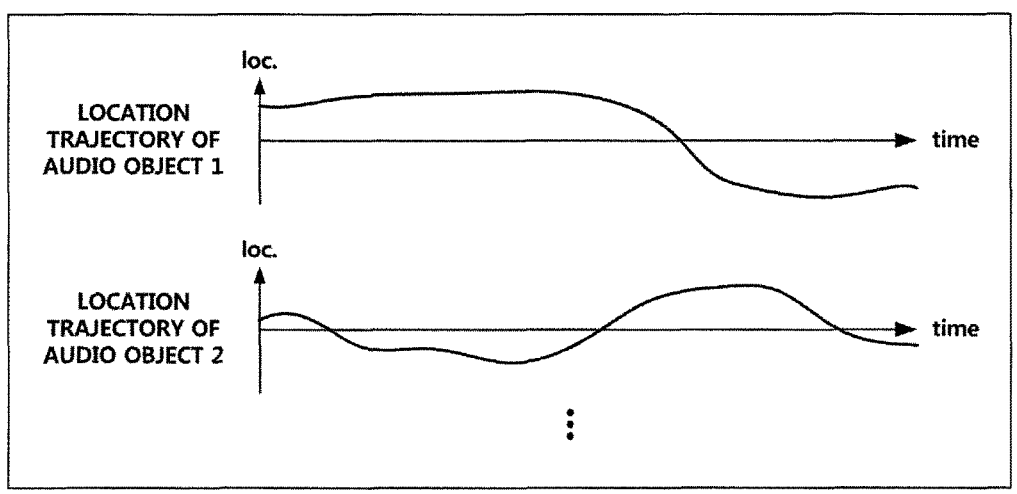

FIG. 5C is a view illustrating an embodiment in which an audio signal processing apparatus performs matching based on a location trajectory, which is a change in location of each object with respect to time. The audio signal processing apparatus may further include a storage unit for storing a change in location with respect to time, and may generate the location trajectory based on a previous location value stored in the storage unit. In FIG. 5C, the horizontal axis of the graph represents time and the vertical axis represents a location value. Although it is shown in FIG. 5C that one dimensional coordinate value (e.g., direction) for the location of an object is changed according to time, an embodiment of the present invention is not limited thereto, and the location trajectory may be generated according to a change in coordinates of two or more dimensions regarding the location of an object.

The audio signal processing apparatus may compare the location trajectory of each visual object with the location trajectory of each audio object and select (i.e., match) the visual object and audio object that represent the most similar location trajectory as mutually related objects. In particular, according to a preferred embodiment of the present invention, the audio signal processing apparatus may calculate the correlation between the location trajectory of each visual object and the location trajectory of each audio object, and match the visual object and the audio object representing the highest degree of correlation. However, a matching method using a location trajectory is not limited thereto.

FIG. 5D is a view illustrating an embodiment in which an audio signal processing apparatus performs matching using location tracking information indicating a relative change in the location of an object with respect to time.

For example, if the location of the visual object is not changed during a specific time slot, the location tracking information in the time slot indicates '0'. If the location of the visual object moves to the right during a specific time slot, a value indicating the moved direction 'R' and the degree of movement may be included in the location tracking information.

FIG. 5D is a view illustrating location tracking information obtained by an audio signal processing apparatus from each object, and the horizontal axis in FIG. 5D shows a time flow. Referring to FIG. 5D, the location tracking information of the first visual object V_obj1 and the third audio object A_obj3 are similar to each other, and accordingly, the third audio object A_obj3 may be selected as an audio object corresponding to the first visual object V_obj1. If the direction L corresponds to a symbol representing a negative number and the direction R corresponds to a symbol representing a positive number, the location tracking information may be converted into a sequence of numbers. In this case, the audio signal processing apparatus may perform object matching by comparing the correlation of the number sequence of the visual objects with the number sequence of the audio objects.

Figure 5E:
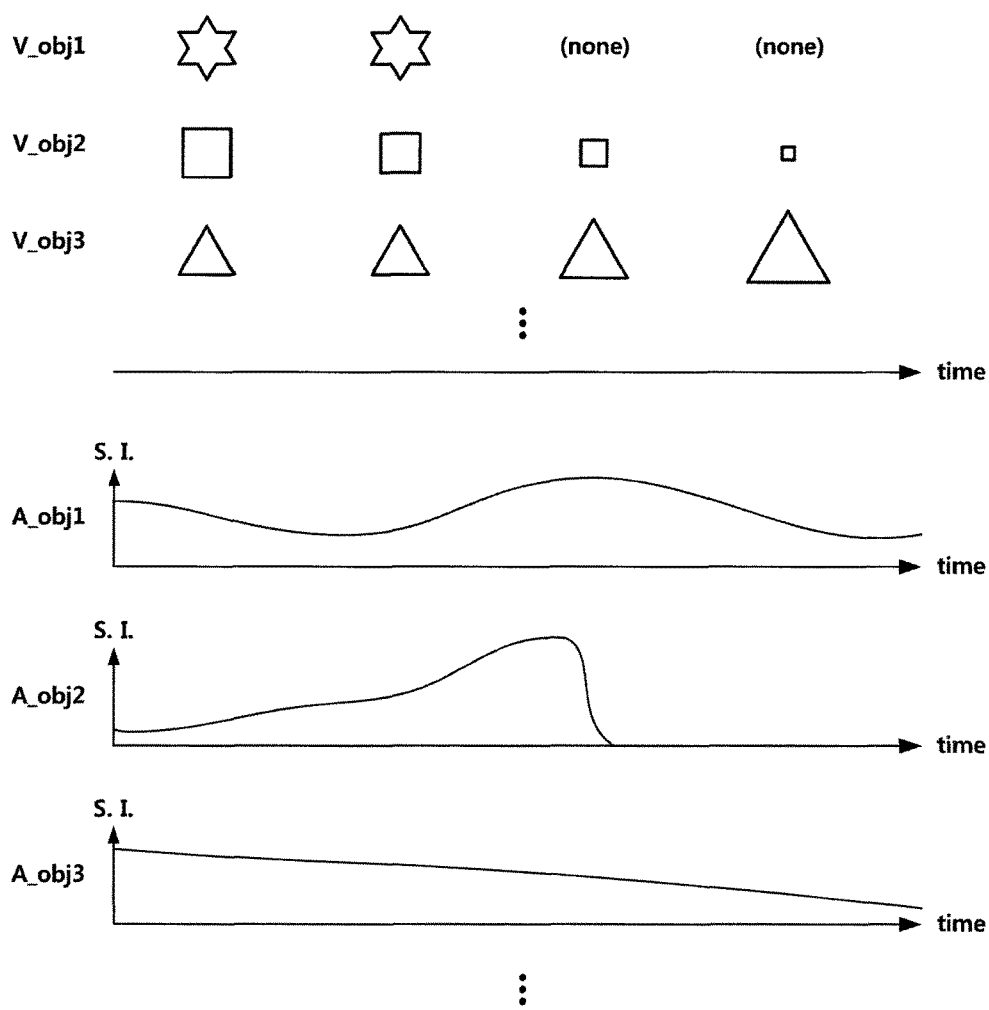

According to another embodiment of the present invention, an audio signal processing apparatus may select an audio object whose acoustic feature is changed in correspondence to a change in a visual feature of a visual object. As described above, the visual feature may include size, shape, and color, and the acoustic feature may include sound intensity, frequency band energy distribution, and the like. Accordingly, the audio signal processing apparatus may select an audio object whose sound intensity changes in correspondence to at least any one of the change in color, shape, and size of a visual object. FIG. 5E is a view illustrating a change in size of a visual object and a change in sound intensity of an audio object. In FIG. 5E, the horizontal axis represents a time flow, and the vertical axis represents the sound intensity S.I. of each audio object in the graph indicating the sound intensity of an audio object. Referring to FIG. 5E, the first visual object V_obj1 is maintained in size, and then disappears, the second visual object V_obj2 is reduced in size according to time, and the third visual object V_obj3 is increased in size according to time. Here, it may be determined that it is a natural phenomenon that the intensity of a sound related to the visual object increases as the size of a visual object increases, and accordingly, the audio signal processing apparatus may determine that the third audio object A_obj3 is matched with the second visual object V_obj2.

According to another embodiment of the present invention, an audio signal processing apparatus may select an audio object whose acoustic feature is changed in correspondence to a change in a visual feature of a visual object. For example, the audio signal processing apparatus may select an audio object whose sound intensity changes in correspondence to a change in distance between a predetermined reference location and the visual object in a virtual video space according to the video signal. Alternatively, the audio signal processing apparatus may select an audio object having a tendency of sound intensity related to a change in the distance between the predetermined reference location and the visual object in the video space. Here, the tendency of the sound intensity may be information indicating whether an average sound intensity (or energy) for each predetermined unit time of a related object is increasing or decreasing over time.

For example, the shape of each visual object shown in FIG. 5E is observed at a reference location in the video space, and it may be assumed that as the size of a visual object is larger, the distance between the visual object and the reference location is closer and as the size of a visual object is smaller, the distance between the visual object and the reference location is farther. In FIG. 5B, since the second visual object V_obj2 is moved away from the reference location over time, the audio signal processing apparatus may select the third audio object A_obj3 whose sound intensity gradually decreases over time.

Figure 6A:
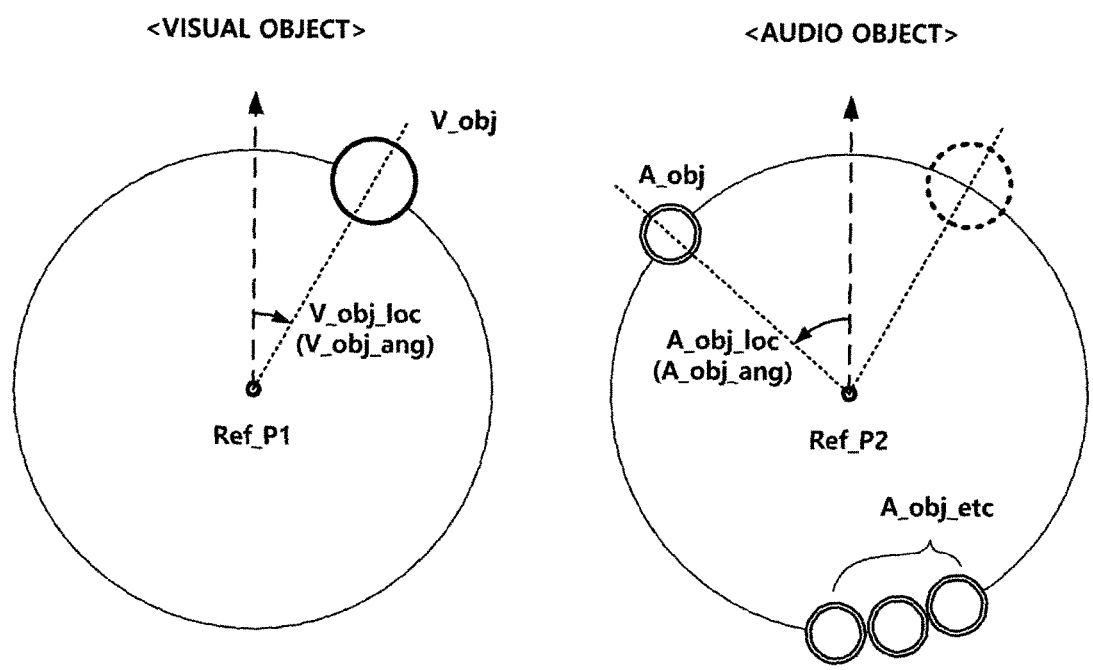
Figure 6B:
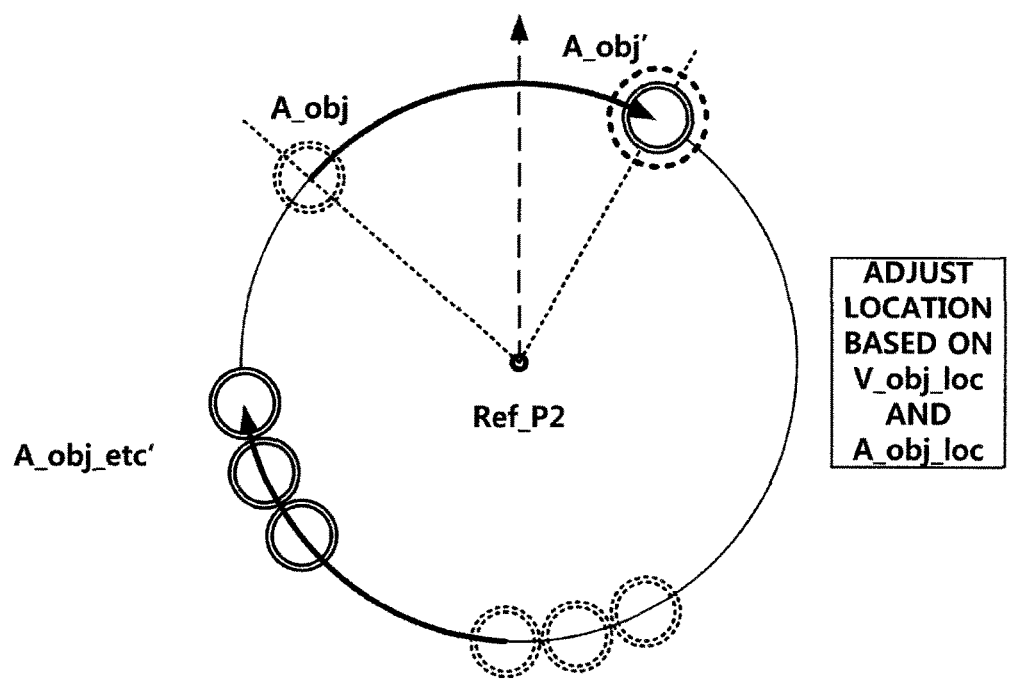

FIGS. 6A and 6B are views illustrating a method for adjusting a location of a sound image of an audio signal according to an embodiment of the present invention. In FIGS. 6A and 6B, Ref_P1 indicates a predetermined reference location or reference point in a virtual video space according to a video signal, and Ref_P2 indicates a predetermined reference location or reference point in a virtual acoustic space according to an audio signal, and the broken line arrow is a reference line indicating a predetermined reference direction. The Ref_P1 and Ref_P2 may represent the same location, and according to an embodiment of the present invention, the Ref_P1 and Ref_P2 may represent the location of a user.

The visual object V_obj may have a location value in a video space, and the location value may be expressed as a value relative to the reference location. This also applies to the audio object A_obj, and the location value of an audio object may also be expressed as a value relative to the reference location. Referring to FIG. 6A, the location V_obj_loc of the visual object may be expressed as an angle value V_obj_ang with respect to the reference direction, and the location A_obj_loc of the audio object may expressed as an angle value A_obj_ang with respect to the reference direction.

Here, when it is assumed that the reference line in the virtual acoustic space and the reference line in the virtual video space indicate the same direction, it is possible to calculate the angle value V_obj_ang according to the location of the visual object and the angle value A_obj_ang according to the location of the audio object. According to the right drawing (i.e., a drawing of an audio object) of FIG. 6A, the visual object V_obj is shown by a dotted line at a location corresponding to the location of the visual object in the virtual acoustic space. Of course, the audio object A_obj may be disposed at a location corresponding to the location of the audio object in the video space, and the angular difference between the two objects may be calculated. Alternatively, each object may be disposed in a third virtual space, and an angular difference between the two objects may be calculated.

Thereafter, the audio signal processing apparatus may adjust the sound image of the audio signal based on the angular difference between the two objects. According to FIG. 6B, the audio signal processing apparatus may rotate the sound image of the audio signal around a predetermined reference location in a virtual acoustic space according to the audio signal. Accordingly, the location of the audio object A_obj may be changed to the location of A_obj', that is, the location of the visual object. Here, the audio signal processing apparatus may rotate the entire sound image of the audio signal. Referring to FIG. 6B, not only the location of the audio object A_obj is moved, it may be confirmed that the location of the other audio object A_obj_etc is moved to the location of A_obj_etc'. However, an embodiment of the present invention is not limited thereto, and the audio signal processing apparatus may rotate at least a part of audio objects. In this case, the audio signal processing apparatus may maintain a sound image of a component other than the audio object in the audio signal, for example, a background sound effect or a background sound. The degree of rotation and the direction of rotation may be determined based on a comparison result of the location of the selected audio object and the location of the visual object corresponding to the selected audio object. That is, with respect to the matched visual objects and audio objects, the rotation direction and the degree of rotation may be determined based on the difference between the angle value V_obj_ang according to the location of the visual object and the angle value A_obj_ang according to the location of the audio object.

Figure 7A:
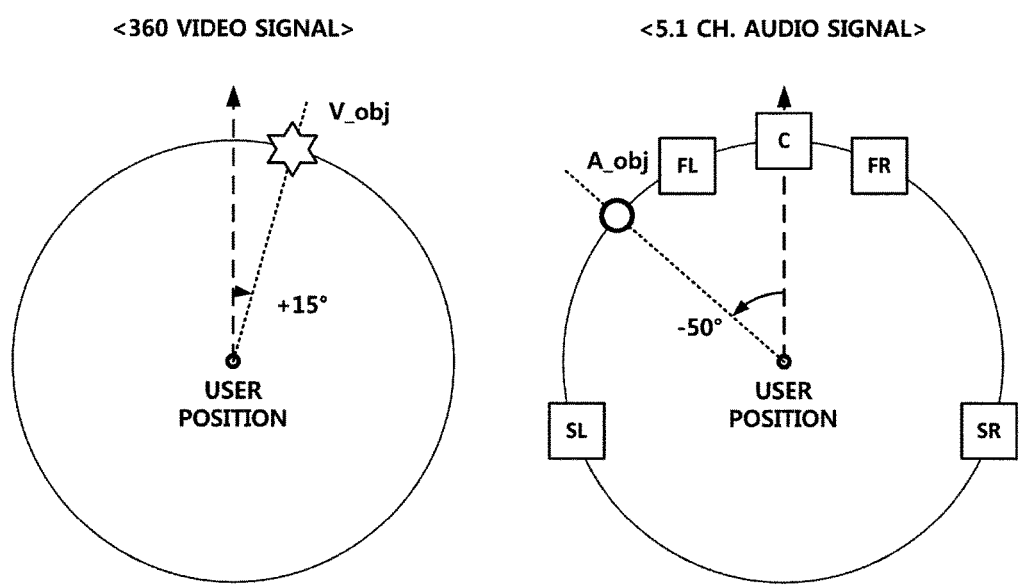
Figure 7B:
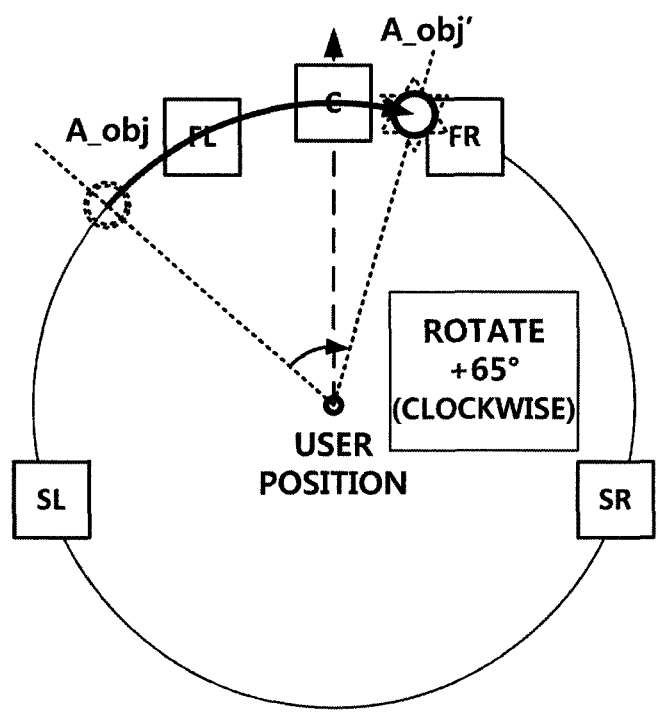

7A and 7B are views illustrating a method for adjusting a location of a sound image of an audio signal according to another embodiment of the present invention. FIGS. 7A and 7B are views illustrating more detailed examples of FIGS. 6A and 6B. Referring to FIG. 7A, the video signal may be a 360-degree video signal, and the audio signal may be a 5.1 channel audio signal. In FIGS. 7A and 7B, it may be assumed that as it rotates more in the clockwise direction, the angle value increases and as it rotates more in the counterclockwise direction, the angle value decreases. When the visual object V_obj has an angle value of +15 degrees and the audio object A_obj has an angle value of −50 degrees, the difference in angular value between the two objects becomes 65 degrees. Since the audio object A_obj should rotate clockwise to move to the location of the visual object V_obj, the location correction value for the audio object is +65 degrees. The audio signal processing apparatus may rotate the location of the sound image of the audio signal by +65 degrees.

FIG. 8 is a view illustrating a method for matching a visual object with an audio object and adjusting the location of a sound image of the audio signal according to yet another embodiment of the present invention.

According to an embodiment of the present invention, an audio signal processing apparatus may extract a visual object from a video signal and extract an audio object from the audio signal. Here, the audio signal processing apparatus may extract at least one candidate visual object from the video signal based on the visual feature of the video signal, and extract at least one candidate audio object from the audio signal based on the acoustic feature of the audio signal. Also, the audio signal processing apparatus may calculate the location of the candidate visual object based on the visual feature, and may calculate the location of the candidate audio object based on the acoustic feature.

According to a preferred embodiment of the present invention, the audio signal processing apparatus may perform a validity check on each candidate object. That is, the audio signal processing apparatus may determine whether each candidate visual object is used to calculate the degree of matching based on the visual feature of each candidate visual object, and determine whether each candidate audio object is used to calculate the degree of matching based on the acoustic feature of each candidate audio object.

Meanwhile, an audio signal processing apparatus according to an embodiment of the present invention may calculate the similarity between an image pattern according to the visual feature of each candidate visual object and a predetermined reference pattern, and determine whether to use each candidate visual feature based on the similarity. Here, the audio signal processing apparatus may not use a candidate visual object having an image pattern whose similarity is equal to or greater than a predetermined similarity reference value in order to calculate the degree of matching. This processing method of such an audio signal processing apparatus may be an example of another validation method for a candidate visual object. Candidate visual objects and candidate audio objects (i.e., validated candidate visual objects and candidate audio objects) used to calculate the degree of matching may be referred to as dominant visual objects and dominant audio objects, respectively.

Thereafter, the audio signal processing apparatus may calculate the degree of matching between the candidate audio object and the candidate visual object according to the change of the location of the candidate audio object. Here, the degree of matching between the candidate audio object and the candidate visual object may be a matching rate between the candidate audio object and the candidate visual object. At this time, if the location of the candidate audio object and the location of the candidate visual object are the same, or if the two location differences are within a predetermined range, it may be defined that the two objects match each other. According to the fourth drawing of FIG. 8, there are five candidate audio objects, of which four candidate audio objects are matched with a candidate visual object, and the audio signal processing apparatus may calculate the matching rate of the candidate audio objects is 4/5 (4/6 in the case of a candidate visual object). The audio signal processing apparatus may maintain a relative location relationship between valid candidate audio objects when changing the location of the candidate audio object. Then, the audio signal processing apparatus may adjust the location of the sound image of the audio signal in correspondence to the location change of the candidate audio object indicating the highest degree of matching. Alternatively, the audio signal processing apparatus may adjust the location of the sound image of the audio signal in correspondence to the location change of the candidate audio object indicating the highest matching rate. According to FIG. 8, when rotates by A_loc _change based on a predetermined reference point Ref_P, the audio signal processing apparatus may determine that the degree of matching or matching rate of the visual object and the audio object is the largest. Accordingly, the audio signal processing apparatus may rotate the location of the sound image of the audio by A_loc _change based on a predetermined reference location Ref_P.

The location movement of the sound image of the audio signal may be provided in various ways. According to the above description, when the audio signal is the HOA signal, the location of the sound image of the audio signal may be converted according to pitch, roll conversion, and the like. If the audio signal is a multi-channel signal, a new multi-channel coefficient may be calculated through a rotation matrix operation. In the case of an object-based audio signal, the location of the sound image of the audio signal may be adjusted by directly correcting the metadata related to the location value of the audio object. However, the location adjustment method of the sound image of the audio signal according to an embodiment of the present invention is not limited thereto.

FIG. 9 is a view illustrating a location of an audio object according to a movement of a visual object. Four drawings on the left side of FIG. 9 show a situation where visual objects rotate clockwise by 90 degrees, and a polygon shown by a broken line means a field of view of a user. Four drawings in the center of FIG. 9 show that the location of a sound image of an audio object is changed depending on the movement of a visual object when the location of the sound image of the audio signal is adjusted according to an embodiment of the present invention. Four drawings on the right side of FIG. 9 show an unadjusted location of a sound image of an audio object according to an embodiment of the present invention. In FIG. 9, an ellipse represents an acoustic space according to an audio signal.

Referring to FIG. 9, at least some of visual objects may be located in the field of view of a user. Here, an angle for forming a range of the user's field of view may be 120 degrees, but an embodiment of the present invention is not limited thereto. Here, the user's viewing range may be limited by a viewing angle provided by the HMD used by the user. Meanwhile, referring to FIG. 9, the sound image of the audio object is shown as being located in the one-dimensional acoustic space and this assumes that the audio signal is a two-channel stereo audio signal. However, an embodiment of the present invention is not limited thereto, and the audio signal may be a three-dimensional stereo audio signal (for example, a binaural audio signal), and accordingly the audio object may be located in a three-dimensional acoustic space. When the audio signal is a stereo audio signal, the range of the acoustic space according to the audio signal may be larger than the range of the user's field of view, so that the range of the acoustic space according to the audio signal may include the range of the user's field of view.

When the sound image of the audio signal is adjusted in a manner according to an embodiment of the present invention, the location of the visual object and the location of the audio object may be matched. Therefore, when newly obtaining information related to the location change of the visual object, the audio signal processing apparatus may directly apply the information related to the location change of the visual object to the audio signal whose sound image is adjusted, and as a result, the location of the audio object may be changed together with the change of the location of the visual object. If the location of the audio object and the location of the visual object do not match each other, a user may be forced to listen to the audio signal having the same sound image location always regardless of the location change of the visual object. Particularly, when the video signal is a 360-degree video and the audio signal to be applied to the video signal is a 2-channel stereo audio signal that does not reflect the movement of the visual object, a similar issue may occur. However, in the case of a 2-channel stereo audio signal, according to an embodiment of the present invention, an audio object may be extracted and the location of the audio object may be obtained through the embodiment of FIG. 4. Then, as rotating the sound image of the 2-channel stereo audio signal based on the difference between the location of the visual object and the location of the audio object, an audio signal processing apparatus may match the locations of the visual object and the audio object.

FIG. 10 is a view illustrating a binaural audio signal processing system 1000 according to an embodiment of the present invention.

The binaural audio signal processing system 1000 according to an embodiment of the present invention may include a core processor 300, a real-world analyzer 400, a personalizer 500, a core interface 600, and an outfit unit 700.

The binaural audio signal processing system 1000 according to an embodiment of the present invention may select an audio object corresponding to a visual object. Then, based on a combination of the location/direction/angle of the user's head, the location/direction/angle of the visual object corresponding to the selected audio object and the location/direction/angle of the selected audio object, the binaural audio signal processing system 1000 may adjust the location of the sound image of the audio signal. The relationship between the location, orientation, and angle of each object is described above and thus description thereof will be omitted.

The real-world analyzer 400, as a configuration corresponding to the sensing unit 150 of FIG. 2, may detect the change of the external environment, the movement of the user, the location of the user's head and the direction of the user's head. Alternatively, the real-world analyzer 400 may receive a user's operation or detect the light or sound of an external environment, and may generate a sensing signal ReWo_INPUT as a result of the detection.

Based on the HRTF database, the binaural impulse response database, the room impulse response database, and the user's body measurement information, the personalizer 500 may generate P_HRTF that is optimized (or personalized) HRTF for the user.

Based on the video signal (or visual object information or video signal related metadata), the sensing signal ReWo_INPUT, and the HRTF (P_HRTF) optimized for the user, the core interface 600 may generate a core parameter CORE_PARAM that is referred to during the operation of a core processor.

Based on the audio input signal AUDIO_IN and the core parameter CORE_PARAM, as a configuration corresponding to the audio signal processing apparatus 100 of FIGS. 1 and 2, the core processor 300 may generate binaural audio signals L and R whose sound image of the audio input signal is adjusted. More specifically, the core processor 300 may select an audio object of an audio signal corresponding to the visual object of the video signal, and based on the combination of the direction of the selected audio object, the direction of the visual object corresponding to the selected audio object and the direction of the head of the user included in the sensing signal ReWo_INPUT, adjust the location of the sound image of the audio input signal AUDIO IN. The core processor 300 according to a preferred embodiment of the present invention may perform binaural rendering on the audio signal whose location of the sound image is adjusted, based on the relative direction of the user's head with respect to the direction of the visual object. Through the above process, the user may appreciate the audio signal that changes according to the change of the visual object, and especially, even when the user moves his head, the location of the sound image of the audio signal may be changed in correspondence to the relative change of the location of the visual object. The above embodiment will be described in detail as follows.

First, the core processor 300 may perform the matching of a visual object and an audio object, and generate a location correction value based on a difference between locations of the matched visual object and audio object. Here, the location correction value may be a value for rotating the sound image of the audio signal by a specific angle with respect to a predetermined reference location (e.g., the location of the user in a virtual video space). Then, the core processor 300 may select an HRTF to be applied to the audio signal based on the direction of the matched visual object and the direction of the user's head. At this time, the core processor 300 may use HRTF optimized for a user (e.g. P_HRTF) when selecting the HRTF. Finally, the core processor 300 may generate binaural audio signals L and R whose location of the sound image is adjusted based on the location correction value and the selected HRTF. However, a method through which the core processor 300 generates the binaural audio signals L and R is not limited thereto.

The generated binaural audio signals L and R may be corrected to match the output method of each output means in the outfit unit 700, thereby generating final output signals L_O and R_O.

FIG. 11 is a view illustrating the location of an audio object according to a movement of a user's head. Four drawings on the left side of FIG. 11 show a situation where a user rotates the head counterclockwise by 90 degrees, and a polygon shown by a broken line means the field of view of the user. Four drawings in the center of FIG. 11 show that the location of a sound image of an audio object is changed depending on the direction of the user's head when the location of the sound image of the audio signal is adjusted according to the embodiment of the present invention. Four drawings on the right side of FIG. 11 show an unadjusted location of a sound image of an audio object according to an embodiment of the present invention, and especially show a situation where a binaural rendering is not performed according to the direction of the user's head. In FIG. 11, an ellipse represents an acoustic space according to an audio signal.

Referring to FIG. 11, at least some of visual objects may be located in the field of view of a user. Here, an angle for forming a range of the user's field of view may be 120 degrees, but an embodiment of the present invention is not limited thereto. Here, the user's viewing range may be limited by a viewing angle provided by the HMD used by the user. Meanwhile, referring to FIG. 11, the sound image of the audio object is shown as being located in the one-dimensional acoustic space, and this assumes that the audio signal is a two-channel stereo audio signal. However, an embodiment of the present invention is not limited thereto, and the audio signal may be a three-dimensional stereo audio signal (for example, a binaural audio signal), and accordingly the audio object may be located in a three-dimensional acoustic space. When the audio signal is a stereo audio signal, the range of the acoustic space according to the audio signal may be larger than the range of the user's field of view, so that the range of the acoustic space according to the audio signal may include the range of the user's field of view.

If the audio signal is a two-channel stereo signal that does not reflect the location change of the visual object, and the location adjustment and binaural processing of a sound image is not performed on the audio signal, a user may only feel the location of the same sound image always regardless of the head direction (FIG. 11, right four drawings). However, according to an embodiment of the present invention, the location of an audio object may be obtained from a 2-channel stereo audio signal. When the location of the sound image of the audio signal is adjusted based on the location (direction) of the visual object corresponding to the audio object, the location (direction) of the audio object and the direction of the user's head, a user may enjoy the change of the audio signal according to the movement of the head and the change of the location of the visual object.

On the other hand, it may be assumed that the video signal is a 360-degree video signal and the audio signal is a binaural audio signal, and the location of the visual object of the video signal and the location of the sound image of the audio object of the binaural audio signal do not match each other. In this case, an audio signal processing apparatus according to an embodiment of the present invention may extract a visual object from a 360-degree video signal and calculate the location of the visual object. Then, an audio signal processing apparatus may calculate the location of the audio object based on the metadata of the binaural audio signal and HRTF information used for rendering the audio object. When the location of a visual object and the location of an audio object, which are related to each other, are different from each other, an audio signal processing apparatus may select a new HRTF for moving the location of the audio object to the location of the visual object. Alternatively, the audio signal processing apparatus may select a new HRTF based on the location difference. Thereafter, an audio signal processing apparatus may reduce the location difference between the audio object and the visual object related to each other by applying the selected HRTF to the audio object.

Referring to FIGS. 1 to 11, an audio signal processing apparatus (or a binaural audio signal processing system) may adjust the location of the sound image of the audio signal based on the location of the selected audio object and the location of the visual object corresponding to the selected audio object. Here, as a result of the location adjustment of the sound image, the location of the selected audio object may be adjusted to be identical or similar to the location of the visual object corresponding to the selected audio object. However, according to an embodiment of the present invention, a method for adjusting the location of objects matching each other is not limited thereto.

A multimedia signal processing apparatus according to another aspect of the present invention may select an audio object corresponding to a visual object extracted from a video signal among at least one audio object extracted from an audio signal. Then, the multimedia signal processing apparatus may adjust at least one of the location of the sound image of the audio signal and the location of the visual image of the video signal based on the location of the selected audio object and the location of the visual object corresponding to the selected audio object. Then, the multimedia signal processing apparatus may output a multimedia signal including an audio signal and a video signal. The multimedia signal may include at least one of an audio signal whose location of the sound image is adjusted and a video signal whose location of the visual image is adjusted. Here, the multimedia signal processing apparatus refers to a device capable of processing signals of various formats including a video signal and an audio signal, and outputting the processed signals. Examples of the multimedia signal processing apparatus include a smart phone, a tablet, a laptop, a desktop computer, and the like, but an embodiment of the present invention is not limited thereto.

That is, the multimedia signal processing apparatus may adjust the location of the visual object corresponding to the selected audio object to be the same as or similar to the location of the selected audio object as a result of the location adjustment of the visual image of the video signal. Here, the visual image may refer to all or at least a part of visual components included in the video signal. More specifically, the visual image, as an image implemented through a color value of a pixel of each location in a video space (2D or 3D, etc.) according to a video signal, may cause visual stimulation of the user. Adjustment of the location of the visual image may be performed by adjusting the color value of a pixel of each location in the video space. For example, when the location of the selected audio object and the location of the visual object corresponding to the selected audio signal are compared, it is assumed that the location of the visual image should be shifted by 100 pixels to the left in the video space. In this case, the multimedia signal processing apparatus may perform a control so that all the pixels in the video space have a color value of a pixel spaced by 100 pixels in the right direction of the pixels. As a result, an effect as if the location of the visual image is moved by 100 pixels to the left in the video space may be implemented. If a video signal is outputted through an HMD or the like, the multimedia signal processing apparatus may adjust the location of the visual image by modifying only the color values of pixels in the video space corresponding to the field of view of the HMD. As another example, when adjusting the location of the visual image based on the location of the selected audio object and the location of the visual object corresponding to the selected audio object, the multimedia signal processing apparatus may rotate the visual image based on a predetermined reference location in the video space according to the video signal. However, a method for moving the location of a visual image according to an embodiment of the present invention is not limited thereto.

Moreover, after adjusting at least one of the location of the sound image of the audio signal and the location of the visual image of the video signal, the multimedia signal processing apparatus may select the HRTF based on the direction of the visual object and the direction of the user's head. Then, the multimedia signal processing apparatus may perform the processing of applying the selected HRTF to the audio signal in the same manner as in FIGS. 10 and 11.

FIG. 12 is a view illustrating a control method of an audio signal processing apparatus according to an embodiment of the present invention. In relation to a control method of an audio signal processing apparatus according to an embodiment of the present invention, an audio object corresponding to a visual object extracted from a video signal may be selected from at least one audio object extracted from an audio signal (S110). Here, the audio signal processing apparatus may select an audio object that changes in correspondence to the change of the visual object. For example, the audio signal processing apparatus may select an audio object whose location changes in correspondence to the change of the location of the visual object. Then, the audio signal processing apparatus may select an audio object related to location tracking information that is the most similar to the location tracking information of the visual object, with respect to location tracking information indicating a relative change of the location of object according to time. As another example, the audio signal processing apparatus may select an audio object whose acoustic feature is changed in correspondence to a change in a visual feature of the visual object. That is, the audio signal processing apparatus may select an audio object whose sound intensity changes according to a change of at least one of a color, a shape, and a size of the visual object. As another example, the audio signal processing apparatus may select an audio object whose sound intensity changes in correspondence to a change in distance between the visual object and a predetermined reference location in a virtual video space according to the video signal.

Meanwhile, a multimedia signal processing apparatus according to an embodiment of the present invention may also select an audio object corresponding to the visual object.

Here, when the audio signal includes a plurality of individual audio signals, the audio signal processing apparatus may calculate the location of the extracted audio object based on the comparison result between the individual audio signals. At this time, the audio signal processing apparatus may calculate the energy according to the frequency band of each individual audio signal, and calculate the location of the audio object based on the comparison result of the energy according to the frequency band between the individual audio signals.

Then, the audio signal processing apparatus may adjust the location of the sound image of the audio signal based on the location of the selected audio object and the location of the visual object corresponding to the selected audio object (S120). Here, the audio signal processing apparatus may rotate the sound image of the audio signal around a predetermined reference location in a virtual acoustic space according to the audio signal. The degree of rotation and the direction of rotation may be determined based on a comparison of the location of the selected audio object and the location of the visual object corresponding to the selected audio object.

Meanwhile, a control method of an audio signal processing apparatus according to an embodiment of the present invention may further include extracting a visual object from a video signal or extracting an audio object from an audio signal. Then, the audio signal processing apparatus may extract at least one candidate visual object from the video signal based on the visual feature of the video signal, extract at least one candidate audio object from the audio signal based on the acoustic feature of the audio signal. Then, the audio signal processing apparatus calculate the location of the candidate visual object based on the visual feature, and calculate the location of the candidate audio object based on the acoustic feature. Then, the audio signal processing apparatus may calculate the degree of matching of the candidate audio object and the candidate visual object according to the change of the location of the candidate audio object. At this time, the audio signal processing apparatus may calculate the similarity between an image pattern according to a visual feature of each candidate visual object and a predetermined reference pattern, and may not use the candidate visual object having an image pattern whose similarity is equal to greater than a predetermined similarity reference value in order to calculate the degree of matching. Then, the audio signal processing apparatus may adjust the location of the sound image of the audio signal in correspondence to the location change of the candidate audio object indicating the highest matching rate.

Meanwhile, a control method of an audio signal processing apparatus according to an embodiment of the present invention may further include detecting the direction of the user's head. With respect to a pair audio object that is the selected audio object and a pair visual object that is a visual object corresponding to the selected audio object, the audio signal processing apparatus may adjust the location of the sound image of the audio signal based on the direction of the user's head, the direction of the pair visual object, and the direction of the pair audio object. Here, the direction of the pair visual object and the direction of the pair audio object may indicate the degree to which the pair visual object and the pair audio object are rotated from a predetermined reference direction based on a predetermined reference location. Through this, the audio signal processing apparatus may perform binaural rendering on an audio signal whose location of the sound image is adjusted, and a user may appreciate the audio signal changed in correspondence to the change of the visual object, and also appreciate the audio signal whose location of the sound image changed in correspondence to the movement of the user's head.

On the other hand, when the audio signal includes a plurality of individual signals, the audio signal processing apparatus may adjust the signal value of the individual audio signal in correspondence to the adjustment of the sound image of the audio signal.

Moreover, according to another embodiment of the present invention, the adjusting of the location of the sound image of the audio signal (S120) may be replaced with adjusting at least one of the location of the sound image of the audio signal and the location of the visual image of the video signal based on the location of the selected audio object and the location of the visual object corresponding to the selected audio object.

Then, the audio signal processing apparatus may output the audio signal whose location of the sound image is adjusted (S130). Alternatively, a multimedia signal processing apparatus according to an embodiment of the present invention may output a multimedia signal including an audio signal and a video signal. Here, the multimedia signal may include at least one of an audio signal whose location of the sound image is adjusted and a video signal whose location of the visual image is adjusted. The detailed description of each operation of the control method will be omitted because it is described with reference to FIGS. 1 to 11.

According to an embodiment of the present invention, the location of a visual object and the location of an audio object may be obtained, and an audio signal may be adjusted so that a video signal and an audio signal match each other based on the obtained locations. Through this, it is possible to provide multimedia contents with increased sense of immersion to a user.

According to an embodiment of the present invention, an audio object may be extracted from an audio signal that does not separately include information on an audio object or information on the location of a sound image of the audio signal, and based on the extracted audio object, the location of the sound image of the signal may be adjusted. Thus, an audio signal in which the interactive characteristics are not considered may be utilized in the production of next generation contents.

Although the present invention is described with reference to the particular embodiments, those skilled in the art will understand that various modifications, additions and substitutions are possible without departing from the scope of the present invention. Therefore, it should be interpreted that those skilled in the art easily deduce conclusions from the detailed description and the embodiments of the present invention and they fall within the scope of the present invention.

What is claimed is:

1. An audio signal processing apparatus comprising:
a processor configured to:
select an audio object whose acoustic feature is changed corresponding to a change of a visual feature of a visual object extracted from a video signal among at least one audio object extracted from an audio signal,
adjust a location of a sound image of the audio signal by using a difference between a location of the selected audio object and a location of the visual object corresponding to the selected audio object,
render the audio signal based on the adjusted location of the sound image, and
output the rendered audio signal.

2. The audio signal processing apparatus of claim 1, wherein the processor is further configured to select an audio object whose location is changed in correspondence to a change of the location of the visual object.

3. The audio signal processing apparatus of claim 2, wherein with respect to location tracking information indicating a relative change of a location of an object according to time, the processor is further configured to select an audio object related to location tracking information that is most similar to location tracking information of the visual object.

4. The audio signal processing apparatus of claim 1 wherein the processor is further configured to select an audio object whose sound intensity is changed in correspondence to a change of at least one of a color, a shape, and a size of the visual object.

5. The audio signal processing apparatus of claim 1, wherein the processor is further configured to select an audio object whose sound intensity is changed in correspondence to a change of a distance between a predetermined reference location and the visual object in a virtual video space according to the video signal.

6. The audio signal processing apparatus of claim 1, wherein the processor is further configured to rotate a sound image of the audio signal related to a predetermined reference location in a virtual acoustic space according to the audio signal based on a degree of the rotation and a direction of the rotation,
wherein the degree of the rotation and the direction of the rotation are determined based on a comparison result of a location of the selected audio object and a location of a visual object corresponding to the selected audio object.

7. The audio signal processing apparatus of claim 1, wherein the processor is further configured to:
extract at least one candidate visual object from the video signal based on a visual feature of the video signal,
extract at least one candidate audio object from the audio signal based on an acoustic feature of the audio signal,
calculate a location of the candidate visual object based on the visual feature of the video signal,
calculate a location of the candidate audio object based on the acoustic feature of the audio signal,
calculate a matching rate that the candidate audio object and the candidate visual object match each other according to a location change of the candidate audio object, and
adjust a location of a sound image of the audio signal in correspondence to a location change of the candidate audio object having a highest calculated matching rate.

8. The audio signal processing apparatus of claim 7, wherein the processor is further configured to:
calculate a similarity between an image pattern according to a visual feature of each candidate visual object and a predetermined reference pattern, and
calculate the matching rate without using the candidate visual object having an image pattern whose similarity is equal to or greater than a predetermined similarity reference value.

9. The audio signal processing apparatus of claim 1, wherein the audio signal comprises a plurality of individual audio signals, and the processor is further configured to:
calculate a location of the extracted audio object based on a comparison result between the individual audio signals, and
adjust a signal value of the individual audio signals in correspondence to an adjustment of a sound image of the audio signal.

10. The audio signal processing apparatus of claim 9, wherein the processor is further configured to:
calculate an energy according to a frequency band of each of the individual audio signals, and, and
calculate a location of the audio object based on a comparison result of energies according to a frequency band between each of the individual audio signals.

11. The audio signal processing apparatus of claim 1, wherein the processor is further configured to detect a direction of a user's head,
wherein, with respect to a pair audio object that is the selected audio object and a pair visual object that is a visual object corresponding to the selected audio object,
wherein the processor is further configured to adjust a location of a sound image of the audio signal based on the direction of the user's head, a direction of the pair visual object, and a direction of the pair audio object,
wherein the direction of the pair visual object and the direction of the pair audio object represent a degree to which the pair visual object and the pair audio object are rotated from a predetermined reference direction based on a predetermined reference location.

12. A multimedia signal processing apparatus comprising:
a processor configured to:
select an audio object whose acoustic feature is changed corresponding to a change of a visual feature of a visual object extracted from a video signal among at least one audio object extracted from an audio signal,
adjust at least one of a location of a sound image of the audio signal and a location of a visual image of the video signal by using a difference between a location of the selected audio object and a location of a visual object corresponding to the selected audio object,
render a multimedia signal based on the at least one of the adjusted location of the sound image and the adjusted location of the visual image, and
output the rendered multimedia signal,
wherein the multimedia signal comprises a least one of the audio signal whose location of the sound image is adjusted and the video signal whose location of the visual image is adjusted.

13. A control method of an audio signal processing apparatus, the method comprising:
selecting an audio object whose acoustic feature is changed corresponding to a change of a visual feature of a visual object extracted from a video signal among at least one audio object extracted from an audio signal;
adjusting a location of a sound image of the audio signal by using a difference between a location of the selected audio object and a location of a visual object corresponding to the selected audio object;
rendering the audio signal based on the adjusted location of the sound image; and
outputting the rendered audio signal.

* * * * *